United States Patent
Ji et al.

(10) Patent No.: US 8,713,137 B2
(45) Date of Patent: *Apr. 29, 2014

(54) FAIL-SAFE UPGRADING OF PORTABLE ELECTRONIC DEVICE SOFTWARE

(75) Inventors: De Ji, Fremont, CA (US); Luosheng Peng, Alviso, CA (US)

(73) Assignee: Innopath Software, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,998

(22) Filed: Nov. 15, 2004

(65) Prior Publication Data

US 2005/0091288 A1   Apr. 28, 2005

Related U.S. Application Data

(63) Continuation of application No. 10/292,245, filed on Nov. 12, 2002, now Pat. No. 6,836,657.

(51) Int. Cl.
*G06F 15/177*   (2006.01)

(52) U.S. Cl.
USPC ............................................... 709/221

(58) Field of Classification Search
USPC .................... 709/219, 221; 717/173
See application file for complete search history.

(56) References Cited

U.S. PATENT DOCUMENTS

| | | |
|---|---|---|
| 4,875,159 A | 10/1989 | Cary |
| 5,444,764 A | 8/1995 | Galecki |
| 5,479,654 A | 12/1995 | Squibb |
| 5,574,906 A | 11/1996 | Morris |
| 5,613,122 A * | 3/1997 | Burnard et al. .................... 713/1 |
| 5,634,052 A | 5/1997 | Morris |
| 5,699,275 A * | 12/1997 | Beasley et al. ................. 709/221 |
| 5,713,024 A * | 1/1998 | Halladay ....................... 717/168 |
| 5,715,462 A * | 2/1998 | Iwamoto et al. ............... 717/173 |
| 5,729,735 A | 3/1998 | Meyering |
| 5,742,905 A | 4/1998 | Pepe |
| 5,745,669 A * | 4/1998 | Hugard et al. .................... 714/3 |
| 5,758,062 A | 5/1998 | McMahon |
| 5,806,078 A | 9/1998 | Hug |
| 5,813,017 A | 9/1998 | Morris |
| 5,832,520 A * | 11/1998 | Miller .......................... 707/203 |
| 5,850,565 A | 12/1998 | Wightman |
| 5,864,757 A | 1/1999 | Parker |
| 5,893,119 A | 4/1999 | Squibb |
| 6,018,747 A | 1/2000 | Burns |
| 6,023,620 A * | 2/2000 | Hansson ........................ 455/419 |
| 6,041,333 A | 3/2000 | Bretschneider |

(Continued)

OTHER PUBLICATIONS

Microsoft Computer Dictionary, 2002, Microsoft Press, 5th Edition. pp. 142, 182, 254, 445.*

(Continued)

*Primary Examiner* — Christopher Biagini
(74) *Attorney, Agent, or Firm* — Gregory & Sawrie LLP

(57) ABSTRACT

A portable communication device is provided that receives upgrade files via at least one wireless coupling. The contents of the upgrade file include information to repair errors in software components of the portable communication device and/or information to upgrade functions of the portable communication device. The portable communication device automatically upgrades the software components using the upgrade file contents. The portable communication device automatically recovers to an operational state when detecting an error or failure during the automatic upgrade. Further, the portable communication device resumes or reinitiates the automatic upgrade following the error or failure.

25 Claims, 16 Drawing Sheets

(56) References Cited

U.S. PATENT DOCUMENTS

| | | | |
|---|---|---|---|
| 6,052,531 A | 4/2000 | Waldin | |
| 6,076,148 A | 6/2000 | Kedem | |
| 6,078,967 A | 6/2000 | Fulghum | |
| 6,088,694 A | 7/2000 | Burns | |
| 6,128,629 A | 10/2000 | Bretschneider | |
| 6,145,012 A | 11/2000 | Small | |
| 6,163,811 A | 12/2000 | Porter | |
| 6,167,258 A | 12/2000 | Schmidt | |
| 6,216,175 B1 | 4/2001 | Sliger | |
| 6,226,784 B1 | 5/2001 | Holmes | |
| 6,233,589 B1 | 5/2001 | Balcha | |
| 6,269,456 B1 | 7/2001 | Hodges | |
| 6,327,671 B1 | 12/2001 | Menon | |
| 6,349,311 B1 | 2/2002 | Sobel | |
| 6,374,250 B2 | 4/2002 | Ajtai | |
| 6,401,239 B1 | 6/2002 | Miron | |
| 6,411,227 B1 | 6/2002 | Fish | |
| 6,442,660 B1 | 8/2002 | Henerlau | |
| 6,457,175 B1 | 9/2002 | Lerche | |
| 6,466,999 B1 | 10/2002 | Sliger | |
| 6,470,329 B1 | 10/2002 | Livschitz | |
| 6,526,574 B1 | 2/2003 | Jones | |
| 6,535,894 B1 | 3/2003 | Schmidt | |
| 6,542,906 B2 | 4/2003 | Korn | |
| 6,594,822 B1 | 7/2003 | Schweitz | |
| 6,615,365 B1* | 9/2003 | Jenevein et al. | 714/6 |
| 6,615,404 B1 | 9/2003 | Garfunkel | |
| 6,629,110 B2 | 9/2003 | Cane | |
| 6,651,061 B2 | 11/2003 | Unchida | |
| 6,651,190 B1 | 11/2003 | Worley | |
| 6,662,163 B1 | 12/2003 | Albayrak | |
| 6,671,703 B2 | 12/2003 | Thompson | |
| 6,671,757 B1 | 12/2003 | Multer | |
| 6,694,336 B1 | 2/2004 | Multer | |
| 6,701,315 B1 | 3/2004 | Austin | |
| 6,754,816 B1 | 6/2004 | Layton | |
| 6,785,786 B1 | 8/2004 | Gold | |
| 6,836,657 B2* | 12/2004 | Ji et al. | 455/419 |
| 6,892,381 B2 | 5/2005 | Kim | |
| 6,898,564 B1 | 5/2005 | Odhner | |
| 6,912,591 B2 | 6/2005 | Lash | |
| 6,925,467 B2* | 8/2005 | Gu et al. | 707/101 |
| 6,954,765 B2 | 10/2005 | Spiegel | |
| 6,976,062 B1* | 12/2005 | Denby et al. | 709/220 |
| 2001/0029178 A1 | 10/2001 | Criss | |
| 2001/0049263 A1 | 12/2001 | Zhang | |
| 2002/0087668 A1* | 7/2002 | San Martin et al. | 709/221 |
| 2002/0099726 A1 | 7/2002 | Crudele | |
| 2002/0120697 A1 | 8/2002 | Generous | |
| 2002/0129107 A1 | 9/2002 | Loughran | |
| 2002/0194535 A1* | 12/2002 | Largman et al. | 714/13 |
| 2003/0005037 A1* | 1/2003 | Aija et al. | 709/203 |
| 2003/0074599 A1* | 4/2003 | Golasky et al. | 714/6 |
| 2003/0110253 A1 | 6/2003 | Anuszczyk | |
| 2003/0131278 A1* | 7/2003 | Fujibayashi | 714/6 |
| 2003/0177149 A1* | 9/2003 | Coombs | 707/204 |
| 2003/0200207 A1 | 10/2003 | Dickinson | |
| 2003/0212712 A1 | 11/2003 | Gu | |
| 2003/0220944 A1 | 11/2003 | Schottland | |
| 2004/0031027 A1 | 2/2004 | Hiltgen | |
| 2004/0062130 A1 | 4/2004 | Chiang | |
| 2004/0073582 A1 | 4/2004 | Spiegel | |
| 2004/0092255 A1 | 5/2004 | Ji | |
| 2004/0098361 A1 | 5/2004 | Peng | |
| 2004/0098413 A1 | 5/2004 | Peng | |
| 2004/0098420 A1 | 5/2004 | Peng | |
| 2004/0098421 A1 | 5/2004 | Peng | |
| 2004/0098427 A1 | 5/2004 | Peng | |
| 2004/0111427 A1 | 6/2004 | Gu | |
| 2004/0111484 A1 | 6/2004 | Young | |
| 2004/0193643 A1 | 9/2004 | O'Brien | |
| 2004/0220980 A1 | 11/2004 | Forster | |
| 2004/0225996 A1 | 11/2004 | Venkatesan | |
| 2004/0260923 A1 | 12/2004 | Nakai | |
| 2005/0010576 A1 | 1/2005 | Ren | |
| 2005/0010870 A1 | 1/2005 | Gu | |
| 2005/0055595 A1* | 3/2005 | Frazer et al. | 713/400 |
| 2005/0060163 A1 | 3/2005 | Barsness | |
| 2005/0091288 A1 | 4/2005 | Ji | |
| 2005/0102318 A1 | 5/2005 | Odhner | |
| 2005/0234997 A1 | 10/2005 | Gu | |

OTHER PUBLICATIONS

Hauptmann, Steffen et al., "On-line maintenance with on-the-fly software replacement", Configurable Distributed Systems, Proceedings, Third IEEE International Conference, May 6, 1996, pp. 80-80.

Chakravorty et al., "Architecture and implementation of a remote management framework for dynamically reconfigurable devices", Networks, 2002. ICON 2002. 10$^{th}$ IEEE International Conference, Aug. 27, 2002, pp. 375-380.

Lyu et al., "A procedure0based dynamic software update", Dependable Systems and Networks, 2001. Proceedings, The International Conference, Jul. 1, 2001. pp. 271-280.

Bialek, R. P., "The architecture of a dynamically updatable, component-based system", Computer Software and Application Conference, 2002. COMPSAC 2002. Proceedings, 26$^{th}$ Annual International, Aug. 26, 2002, pp. 1012-1016.

Gumbold, M., "Software distribution by reliable multicast", Local Computer Networks, 1996. Proceedings, 21$^{st}$ IEEE Conference, Oct. 13, 1996, pp. 222-231.

Tichy, Walter F., "The string-to-string correction problem with block moves", ACM Transaction on Computer Systems, vol. 2, No. 4, Nov. 1984, pp. 309-321.

Ajtai, Miklos et al., "Compactly encoding unstructured inputs with differential compression", IBM Almaden Research Center, 44 pages.

Burns, Randal C. et al., "In-place reconstruction of delta compressed files", IBM Almaden Research Center, 9 pages.

Burns, Randal et al., "In-place reconstruction of version differences", IBM Almaden Research Center, 25 pages.

Liv, Jacob et al., "A universal algorithm for sequential data compression", IEEE Transactions on Information Theory, vol. IT-23, No. 3, May 1977.

* cited by examiner

FAIL-SAFE UPGRADING OF PORTABLE ELECTRONIC DEVICE SOFTWARE

RELATED APPLICATIONS

This application is a continuation application of U.S. patent application Ser. No. 10/292,245, filed Nov. 12, 2002 now U.S. Pat. No. 6,836,657. This application is related to application Ser. No. 10/146,545, filed May 13, 2002, and application Ser. No. 10/261,153, filed Sep. 30, 2002, both of which are currently pending.

TECHNICAL FIELD

The disclosed embodiments relate to updating and maintaining electronic files.

BACKGROUND

Software running on a processor or central processing unit (CPU) to provide functionality in the host device often changes over time. The changes may result from the need to correct bugs, or errors, in the software files, adapt to evolving technologies, or add new features and functions. In particular, embedded software components hosted on mobile wireless devices often include numerous software bugs that require correction.

Software includes one or more files in the form of human-readable American Standard Code for Information Interchange (ASCII) plain text files or binary code. Software files can be divided into smaller units that are often referred to as modules or components. A UNIX platform or personal computer (PC) includes multiple software components, and each of the software components is managed and updated independently through a file system supported by a corresponding operating system (OS). Information used to update software files or software components hosted on UNIX platforms or PCs can be transferred through the Internet or loaded from a secondary storage medium such as a floppy disk, a compact disk read-only memory (CD-ROM), or a compact flash card.

In contrast, in mobile wireless devices, a real-time operating system (RTOS) is typically used in which all software components are linked as a single large file. Further, no file system support is typically provided in these mobile wireless devices. In addition, the single large file needs to be loaded, or embedded, into the device and updated using a wireless communication link or over-the-air (OTA) link like a radio link. Consequently, problems arise with regard to delivering software file updates to mobile devices like cellular telephones and other mobile communication devices, personal digital assistants (PDAs), and personal computers.

One solution to the problem of delivering large files to mobile devices for use in updating files of the mobile devices uses difference programs to generate difference files. The difference files include data that describes how a revised or new file differs from an original file. While use of the various difference programs helps reduce the size of the transferred files, issues remain as to the reliability associated with provision of the updates to the mobile devices.

For example, file delivery and updating via an OTA link carries with it an increased probability of failure. These failures generally relate to failures associated with components of the service provider network and/or components of the numerous mobile devices that must receive the updates. Examples of the types of failures that can occur include mobile device hardware failures, software failures, failures relating to power (battery) exhaustion, and failures as a result of disconnections of the mobile device from the network during the update process. Regardless of the cause of the update failure device manufacturers and service providers must ensure, when providing software updates to the mobile devices via over-the-air (OTA) connections, that the mobile device is completely recoverable in the event of failures during the update process.

Figure 1:
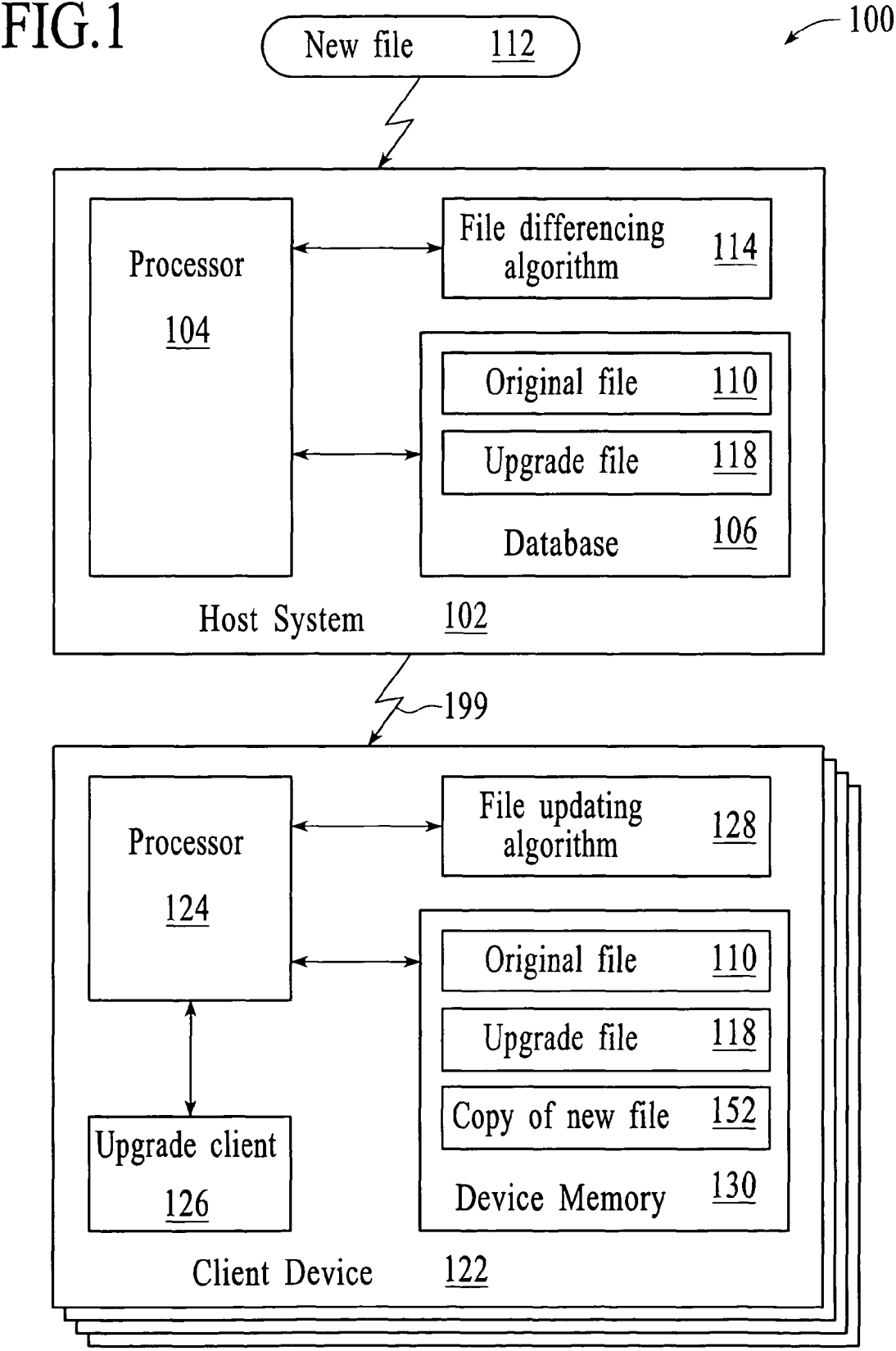
FIG. 1 is a block diagram of a file upgrade system, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 116 is first introduced and discussed with respect to FIG. 1).

Unless described otherwise below, the construction and operation of the various blocks and structures shown in the Figures are of conventional design. As a result, such blocks need not be described in further detail herein, because they will be understood by those skilled in the relevant art. Such further detail is omitted for brevity and so as not to obscure the detailed description of the invention. Any modifications necessary to the Figures can be readily made by one skilled in the relevant art based on the detailed description provided herein.

Referring to FIGS. 3, 4, 5A, 5B, 7A, 7B, 9, and 11-14, the operations of the flow diagrams are under control of at least one processor, but are not so limited. Each of the blocks depicted in these flow diagrams is of a type well known in the art, and can itself include a sequence of operations that need not be described herein. Those skilled in the relevant art can create source code, microcode, program logic arrays or otherwise implement the invention based on these flow diagrams and the detailed description provided herein. The algorithm or routine operating according to these flow diagrams is stored in non-volatile memory (not shown) that forms part of the associated processors, in the associated memory areas, in removable media (not shown), such as disks, or hardwired or preprogrammed in chips (not shown), such as EEPROM semiconductor chips, or in any combination of these components, but is not so limited.

DETAILED DESCRIPTION

A system and associated methods are provided below for providing fail-safe software upgrades in client devices including mobile devices. In the event of a failure during a software upgrade that prevents successful completion of the upgrade, the upgrade system of an embodiment recovers the client devices to a pre-update state. The upgrade system subsequently either resumes or re-initiates the update that was in progress at the time of the failure.

In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

FIG. 1 is a block diagram of a file upgrade system 100, under an embodiment. Generally, the file upgrade system 100 includes a first computer system 102, or host system, and one or more second computer systems including client devices or computers 122. The host system 102 and the client devices 122 each include at least one processor 104 and 124, respectively, operating under program control, but are not so limited. The host system 102 and the client devices 122 communicate via a communication path 199. These computer systems 102 and 122 include any collection of computing devices operating together, as is known in the art. The computer systems 102 and 122 can also include components within a larger computer system.

The processor 104 of the host system 102 couples among a database 106 and a file differencing algorithm 114, under program control. Alternatively, various other components of the host system 102 can couple among the processor 104, the database 106, and the file differencing algorithm 114 and provide file updating functions under program control. While one processor 104, one database 106, and one file differencing algorithm 114 are shown, various alternative embodiments include any number and/or type of each of these components coupled in various configurations contemplated by one skilled in the art. Further, while the processor 104, database 106, and file differencing algorithm 114 are shown as separate blocks, some or all of these blocks can be monolithically integrated onto a single chip, distributed among a number of chips or components of a host system, and/or provided by some combination of algorithms. The file differencing algorithm 114 can be implemented in software algorithm(s), firmware, hardware, and any combination of software, firmware, and hardware. The term "processor" as generally used herein refers to any logic processing unit, such as one or more central processing units (CPUs), digital signal processors (DSPs), application-specific integrated circuits (ASIC), etc.

Likewise, the client devices 122 of an embodiment include a processor 124 coupled among a device memory 130 and a file updating algorithm 128, under program control. Alternatively, various other components of the client devices 122 can couple among the processor 124, the device memory 130, and the file updating algorithm 128 and provide file updating functions under program control. While one processor 124, one device memory 130, and one file updating algorithm 128 are shown, various alternative embodiments include any number and/or type of each of these components coupled in various configurations contemplated by one skilled in the art. Further, while the processor 124, device memory 130, and file updating algorithm 128 are shown as separate blocks, some or all of these blocks can be monolithically integrated onto a single chip, distributed among a number of chips or components of a host system, and/or provided by some combination of algorithms. The file updating algorithm 128 can be implemented in software algorithm(s), firmware, hardware, and any combination of software, firmware, and hardware.

The communication path 199 includes any medium for communicating or transferring files among the computer systems 102 and 122. Therefore, this path 199 includes wireless connections, wired connections, and hybrid wireless/wired connections. The communication path 199 also includes couplings or connections to networks including local area networks (LANs), metropolitan area networks (MANs), wide area networks (WANs), proprietary networks, interoffice or backend networks, and the Internet. Furthermore, the communication path 199 includes removable fixed mediums like floppy disks, hard disk drives, and CD-ROM disks, as well as flash RAM, Universal Serial Bus (USB) connections, RS-232 connections, telephone lines, buses, and electronic mail messages.

The host system 102 and the client devices 122 each include an original version 110 of an electronic file, referred to herein as the original file 110 or the old file. The host system 102 stores the original file 110 in a database 106 or other memory area or combination of memory areas or devices, but is not so limited. The client devices 122 store the original file 110 in device memory for use in operation.

At such time as a software provider upgrades the original file 110, for example to provide additional functionality or to fix a software bug, a new version 112 of the electronic file is generated. The new version 112 of the electronic file is referred to herein as the new file 112. The new file 112 is generally an updated or revised version of the original file 110, but is not so limited. The software provider transfers the new file 112 to the host system 102.

The electronic files 110 and 112 include software files including dynamic link library files, shared object files, embedded software components (EBSCs), firmware files, executable files, data files including hex data files, system configuration files, and files including personal use data, but are not so limited. Since any type of file can be regarded as a byte stream, hereafter a file can be described as a byte stream.

Components of the host system 102 including at least one processor 104 receive and process the new file 112 in order to generate upgrade information for use in upgrading the hosted original files 110 of the client devices 122. In an embodiment, the processor 104 generates an upgrade file 118 for use in transferring information of the upgrades to the client devices 122. The upgrade file 118 can include a difference file that codes differences between the new file 112 and the original file 110 or, alternatively, can include any number and/or combination of components or modules of the new file 112. The host system 102 provides the upgrade information to the client devices 122 via transfer of the upgrade file 118 over the communication path 199.

In embodiments where the upgrade file 118 includes a difference file, components of the host system 102 including the processor 104 and the file differencing algorithm 114 process a comparison between the new file 112 and the corresponding original file 110, thereby calculating the differences between the new file 112 and the original file 110. The file differencing algorithm 114 generates the difference file during the comparison and writes the difference file to the upgrade file 118.

The upgrade file 118 is transferred or transmitted to the client devices 122 via the communication path 199. Prior to transfer, the upgrade file 118 may be compressed using any of a number of compression techniques known in the art, but is not so limited.

Components of the client devices 122 including the processor 124 and the upgrade client 126 receive the upgrade file 118 and control the upgrade of the original file using the upgrade file 118. In an embodiment, the upgrade client 126, including the file updating algorithm 128, processes information of the upgrade file 118 along with the hosted original file 110 to generate a copy of the new file 152. This copy of the new file 152 is subsequently used by the upgrade client 126 to upgrade 154 the targeted original file 110 hosted on the client devices 122. The upgrade client 126 of an embodiment uses numerous methods to update EBSCs depending on the file type to be updated and the resources allocated by the client device manufacturer to support these updates, as described below and in the Related Applications. Upon completion of this update process, the original file 110 now stored on the client devices 122 is the same as the new file 112 received in the host system 102.

Those skilled in the relevant art will appreciate that those functions associated with the upgrade system 100 as well as the other functions and methods described herein with reference to the upgrade system 100 can be performed by components of the host system 102, components of the client devices 122, or distributed among any combination of components of the host system 102 and the client devices 122. Components of the host system 102 and client devices 122 can be implemented as application specific integrated circuits (ASICs), by digital signal processing (DSP) integrated circuits, and/or through conventional programmed logic arrays or circuit elements. The embodiments described herein can be implemented using any combination of hardware, firmware, and software running on one or more processors, where the software can be stored on any suitable computer-readable medium, such as microcode stored in a semiconductor chip, on a computer-readable disk, or downloaded from a server and stored locally at a client.

Figure 2:
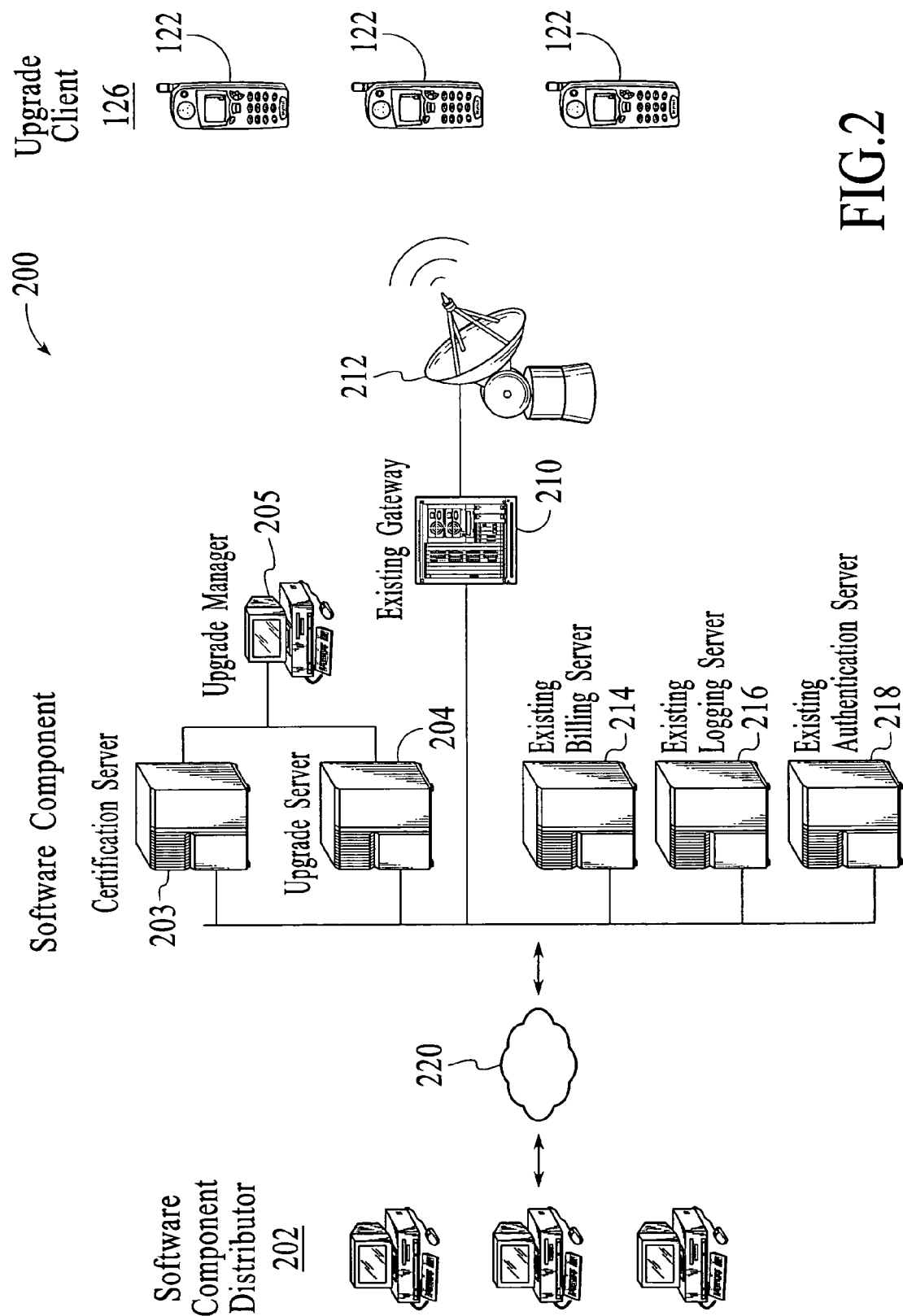
FIG. 2 is a block diagram of an example service provider infrastructure including components of the file upgrade system of an embodiment.

FIG. 2 is a block diagram of an example service provider infrastructure 200 including components of the file upgrade system 100 of an embodiment. In this embodiment the service provider infrastructure is described in the context of a cellular telephone network or infrastructure, but alternative embodiments are not so limited. The service provider infrastructure 200 includes, but is not limited to, a Software Component Distributor (SCD) 202, service provider upgrade components 203-205, and an upgrade client 126 hosted on the client devices 122. The service provider upgrade components 203-205 include an upgrade server 204 coupled among a software component certification server 203 and an upgrade manager 205.

With further reference to FIG. 1, the SCD 202 of an embodiment of the service provider infrastructure 200 includes components or functions of the host system 102. In alternative embodiments, the service provider upgrade components 203-205 host components or functions of the host system 102. In other alternative embodiments the components or functions of the host system 102 are distributed among components of the SCD 202 and the service provider upgrade components 203-205.

The service provider infrastructure 200 of an embodiment supports numerous types of software file or component upgrades on client devices 122 including mobile electronic devices, mobile communication devices, cellular telephones, personal digital assistants, computers, and other processor-based devices via the upgrade system components and various mechanisms of the service provider's wireless infrastructure. These systems function by receiving new and revised software from a software distributor, generating an upgrade file from the new software, and transferring the upgrade file to the client devices 122 via the service provider infrastructure. The upgrade client 126 of the client devices 122 uses the upgrade file to update the targeted software hosted on the client devices 122.

The SCD 202 of an embodiment provides a user interface by which software providers package and release new embedded device software components. Functions of the SCD 202 include registering device information and submitting device information to the software component certification server. Also, the SCD 202 receives new and original EBSCs, calculates or generates file differences using the new and original EBSCs, registers and packages embedded software, and submits embedded software packages to the software component certification server 203. The new or revised software, following release, is provided to the service provider upgrade components 203-205 via a wired, wireless, or hybrid wired/wireless network coupling or connection 220, but is not so limited.

The SCD 202 of an embodiment is hosted on processing systems of the client device manufacturers. In an alternative embodiment, the SCD 202 is hosted on processing systems of an application or system software provider. In another alternative embodiment, the SCD 202 is hosted on processing systems of the service carrier or provider, for example hosted on or distributed among the upgrade components 203-205.

The service provider upgrade components 203-205 are coupled among the software component distributor 202, the client devices 122, and the existing components of the service provider's infrastructure 210-218, including the existing gateway 210 and communication infrastructure 212, billing server 214, logging server 216, and authentication server 218.

The software component certification server 203 provides an interface to the manufacturers of client devices and, thus, receives new device information on embedded software packages from device manufacturers. The software component certification server 203 also repackages and distributes approved software packages to upgrade servers.

The upgrade manager 205, while functioning as an interface among the software component certification server 203 and the upgrade server 204, configures software and data packaging for optimal device management, schedules remote change notifications, and controls the update policy monitor system. Moreover, the upgrade manager 205 provides integration with the systems of the existing infrastructure.

The upgrade server 204 provides capabilities including authenticating, connecting, and communicating with mobile client devices 122 to perform embedded software component upgrades. Communication with client devices 122 can occur via couplings 212 with the client devices 122 that include wireless couplings, wired couplings, hybrid wired/wireless couplings, and other network coupling types, as appropriate to the corresponding service provider. In addition, the upgrade server 204 supports existing billing, data collection, and logging services of the service provider.

As an example of communications among the upgrade server 204 and client devices 122, when an upgrade file is available for transfer to a client device 122 from the upgrade server 204, the server 204 sends a user notification to notify the client device user that there are software components available for updating. The user notification can take the form of a text message via a Short Message Service (SMS) push protocol, Hypertext Transfer Protocol (HTTP), or Wireless Application Protocol (WAP), but is not so limited. Upon receiving confirmation from the handset users, the upgrade server 204 uses the original handset data communication protocol to send the upgrade file to the requesting handset.

In response to receipt of the confirmation from the handset, the upgrade server 204 authenticates and authorizes the user and/or requesting device, and verifies prerequisite capabilities and limitations of the requesting device. Following authentication the upgrade server 204, as the manager of client device configuration data, identifies the current versions of embedded software components of the requesting device 104, identifies and transfers appropriate delta files to the requesting device 104, logs the status of the upgrade transaction, and reports the results to the upgrade manager 205. In addition, the upgrade server 204 activates/deactivates the software upgrade service over the air, and notifies remote users of software changes.

With reference to FIG. 1, the upgrade client 126 is embedded in the client devices 122, but is not so limited. The upgrade client 126 stores and maintains configuration data of the client devices 122, and provides for the maintenance and upgrading of embedded device software components using the file updating algorithm 128. The upgrade client 126 supports a simple user interface and is incorporated into mobile device software. Upon execution, the upgrade client 126 automatically detects the remote change of any embedded software components, notifies users of an embedded software component upgrade, and upgrades a software component based on the carriers and/or users control, as appropriate for a particular service provider.

The upgrade system 100 and service provider infrastructure 200 of an embodiment support numerous types of software file or component update, including updates to executable files, byte stream files, and data files, but are not so limited. The executable files, or image files, include software files used in the client device to execute tasks, for example the operating system (OS), hardware device drivers, and K Virtual Machine (KVM) files. The byte stream files include files used by other executable files, for example, icon files, logo files, and MP3 files. Data files include files containing personal use data, and handset reference data, for example the calibration configuration files, the Protocol Independent Multicast (PIM) files, and system configuration files.

The upgrade client of an embodiment uses numerous methods to update EBSCs depending on the file type to be updated and the resources allocated by the client device manufacturer to support these updates, as described in the Related Applications. These update methods of an embodiment include non-critical component updates and critical component updates, where these categories are based on the functions provided by the software components targeted for update.

Non-critical components include embedded software components (EBSCs) that are easily recovered over the air following a failure during the update process. Examples of non-critical components include browsers and KVM files, but are not so limited. Critical components include software components used in the update procedure or the EBSCs critical to device operation. Further, critical components include EBSCs that are not easily recovered over the air following a failure during the update process. Examples of critical components include the operating system files, protocol stacks, the upgrade client files, communication libraries, and display or LCD driver files, but are not so limited.

The client devices 122 determine the status of numerous device parameters prior to participating in an update procedure. This is done in order to pre-qualify the device for the update procedure, or verify that the condition of the client device is such that the update procedure can be completed once begun. The client device pre-qualification includes, but is not limited to, determining if the client device is in a cradle or charging mode, if the client device is connected to a serial cable, if the state of battery charge is sufficient to perform the updating process, if the Received Signal Strength Indication (RSSI) or signal strength is sufficient for the data transfer, and if the targeted EBSC is currently in use.

In spite of pre-qualifying the client devices 122 for the update procedure, failures in the update can occur as a result of hardware failures, power (battery) failures, and failures of the network-connection, to name a few. The upgrade system 100 of an embodiment provides fail-safe software file updates by recovering the client devices 122 to a pre-update state and either resuming or re-initiating the update that was in progress at the time of the failure. Components of the upgrade server 204 and the upgrade client 126 include an automatic failure recovery mechanism that provides the fail-safe updates, as described below.

The client device of an embodiment stores data of the relationship among the EBSCs of the client device software, referred to herein as file configuration data, in a module-based memory management (MBMM) EBSC. The MBMM EBSC is referred to herein as a configuration file. The configuration data also includes upgrade status information. The upgrade status information includes detailed information relating to the status of upgrades to client device software including, for example, information as to where a failure or error occurred during an attempted upgrade. Because of the importance of the configuration data to the operation of the client device, the upgrade client provides access to accurate configuration data as well as maintains the configuration data through file upgrades, as follows.

Figure 3:
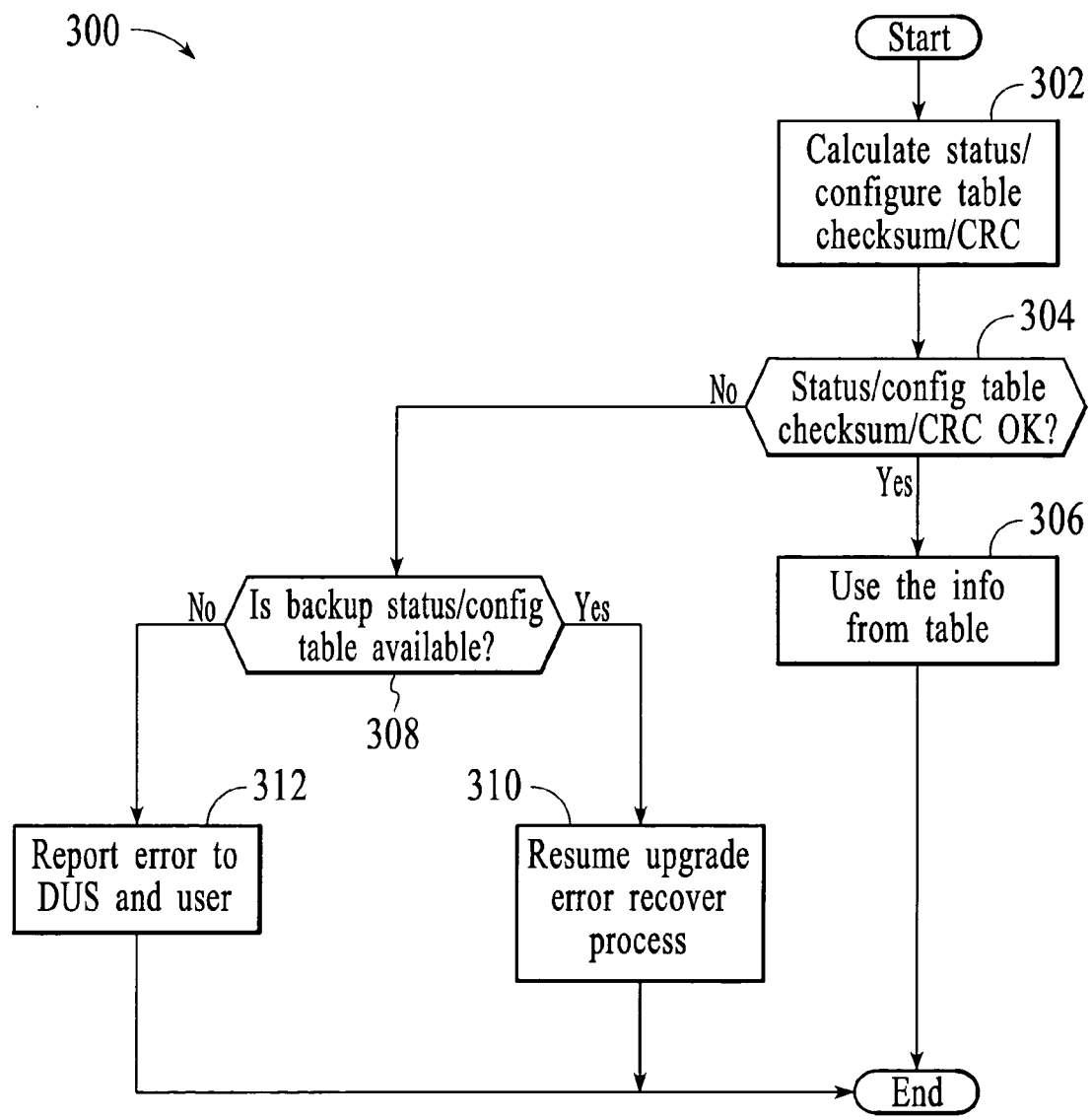
FIG. 3 is a flow diagram for accessing information of client device configuration files, under an embodiment.

FIG. 3 is a flow diagram 300 for accessing configuration data of client device configuration files, under an embodiment. The upgrade client verifies the accuracy of the original configuration data using a verification calculation or algorithm, at block 302. While the embodiments described herein include the use of verification processes or algorithms that use, for example, checksum values or Cyclic Redundancy Codes (CRCs), the embodiments may use any verification process or algorithm contemplated by one skilled in the art. The verification calculation or algorithm recalculates the checksum or CRC, as appropriate, and compares it to a corresponding value stored in the client device with the original configuration data. If the verification shows the original configuration data to be accurate, or free of errors, at block 304, then the upgrade client proceeds with operations using the original configuration data, at block 306.

If the verification indicates the original configuration data contains errors, at block 304, then the upgrade client determines whether backup configuration data is available in the client device, at block 308. The upgrade client proceeds with the error recovery process, at block 310, when backup configuration data is available in the client device. The error recovery process, as described further below, restores accurate configuration data to the configuration files. When backup configuration data is not available in the client device, the upgrade client uses resources of the client device to report the error to the client device user and the service provider's upgrade server, at block 312.

Figure 4:
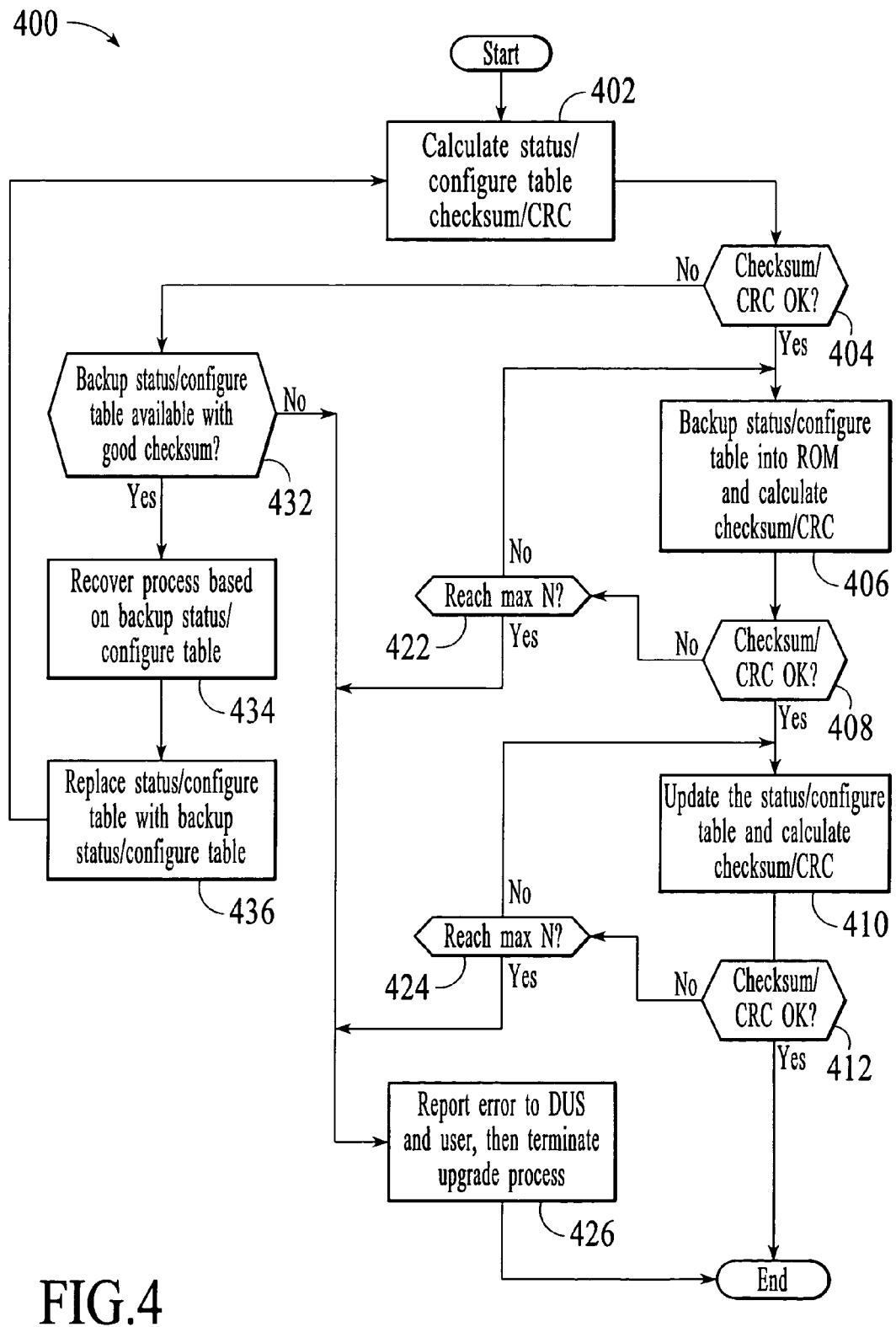
FIG. 4 is a flow diagram for upgrading client device configuration files, under an embodiment.

In addition to providing read access to the configuration data, the upgrade client maintains and updates configuration data as it does the other EBSCs of the client device. FIG. 4 is a flow diagram 400 for upgrading client device configuration files, under an embodiment. As described above, the upgrade client receives an upgrade file for use in upgrading the original configuration data. In response to receipt of the upgrade file, the upgrade client verifies the accuracy of the original configuration data currently stored in the client device using a verification calculation/algorithm like, for example, checksum or Cyclic Redundancy Check (CRC), at block 402. If the verification shows the original configuration data to be accurate, or free of errors, at block 404, then the upgrade client proceeds with upgrading the original configuration data by writing a backup version of the original configuration data to a backup configuration file in client device memory (ROM), at block 406. The upgrade client also performs verification calculations on the backup configuration data as written to the backup configuration file, at block 406, and verifies the accuracy of the backup configuration data, at block 408. When the verification shows the backup configuration data to be free of errors, at block 408, the upgrade client upgrades the original configuration data of the configuration file using information of the upgrade file, at block 410. The upgrade client verifies the accuracy of the upgraded or new configuration data, at block 412, and ends the upgrade process if the upgraded configuration data is free of errors.

Following writing of the backup configuration data to the backup configuration file, at block 406, when the verification results indicate errors in the backup configuration data, at block 408, the upgrade client repeats the process of writing the original configuration data to the backup configuration file and performing the verification calculations. This process of rewriting and recalculating is performed until either the backup configuration data is successfully written to the backup configuration file, or until the process has been repeated a pre-specified number of times, N. Upon performing the rewrite the pre-specified number of times N without success, at block 422, the upgrade client uses resources of the client device to report the error to the client device user and the service provider's upgrade server, at block 426, and terminates the upgrade process.

Following upgrading of the configuration data, at block 410, when the verification results indicate errors in the new configuration data, at block 412, the upgrade client repeats the process of upgrading the original configuration data and performing the verification calculations. This process of rewriting and recalculating is performed until either the original configuration data is successfully upgraded to the new configuration data, or until the process has been repeated a pre-specified number of times, N. Upon performing the rewrite the pre-specified number of times N without success, at block 424, the upgrade client uses resources of the client device to report the error to the client device user and the service provider's upgrade server, at block 426, and terminates the upgrade process.

If the verification indicates the configuration table data contains errors, at block 404, then the upgrade client determines whether backup configuration data is available in the client device, at block 432. The upgrade client proceeds with the error recovery process, at block 434, when backup configuration data is available in the client device. The error recovery process restores accurate configuration data to the configuration files by writing the backup configuration data from the backup configuration file to the configuration file, thereby writing over the erroneous configuration data with the backup configuration data, at block 436. The upgrade client also performs verification calculations on the backup configuration data, at block 402.

When backup configuration data is not available in the client device, at block 432, the upgrade client uses resources of the client device to report the error to the client device user and the service provider's upgrade server, at block 426. The upgrade client then terminates the upgrade process.

In addition to upgrading the configuration files, as described above, embodiments of the upgrade client perform upgrades of the EBSCs of the software hosted on the client devices. The upgrades include upgrades using both difference files and entire new files, as described below.

Figure 5A:
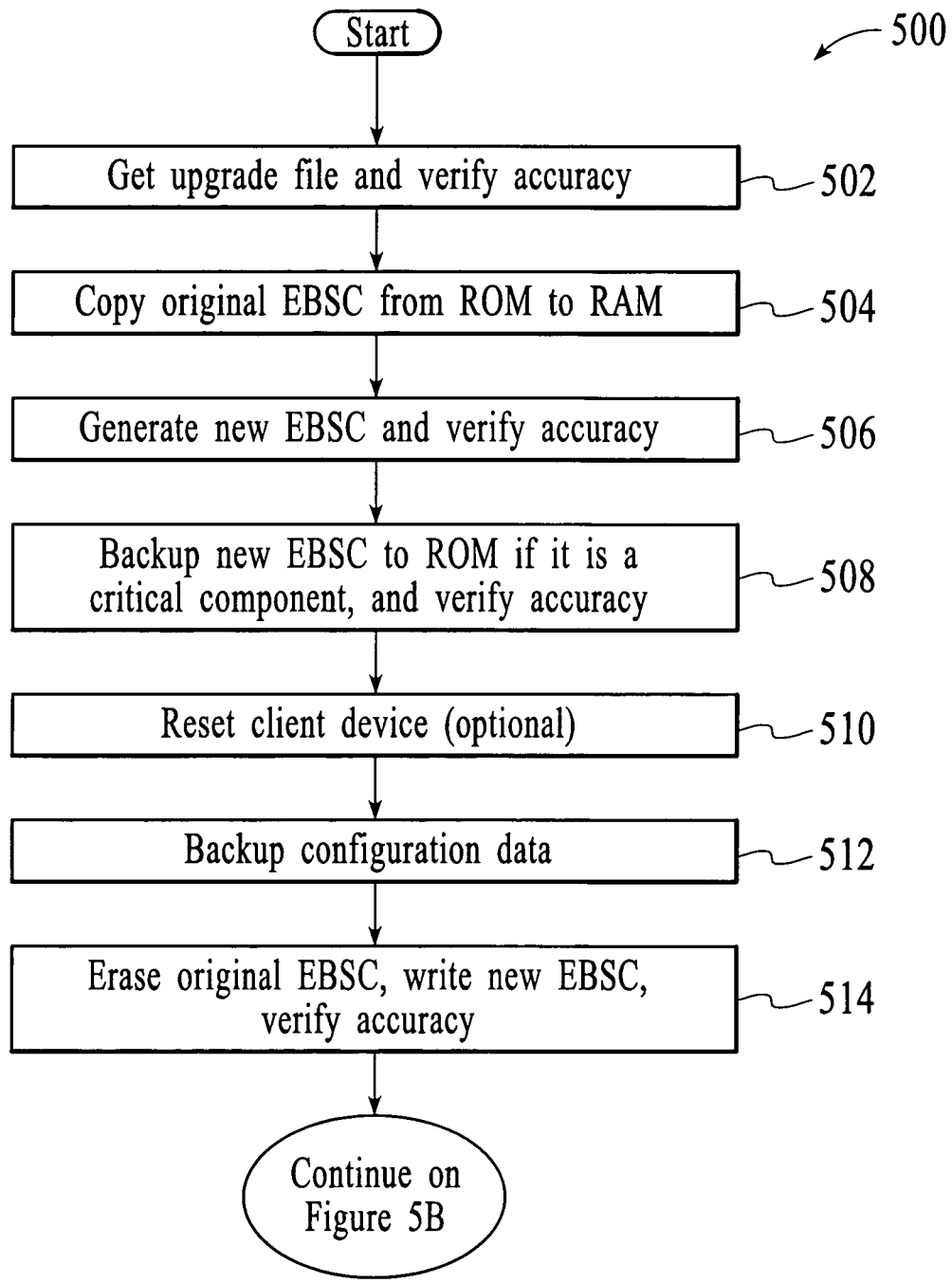
FIGS. 5A and 5B are a flow diagram for upgrading critical software components using difference files, under an embodiment.
Figure 5B:
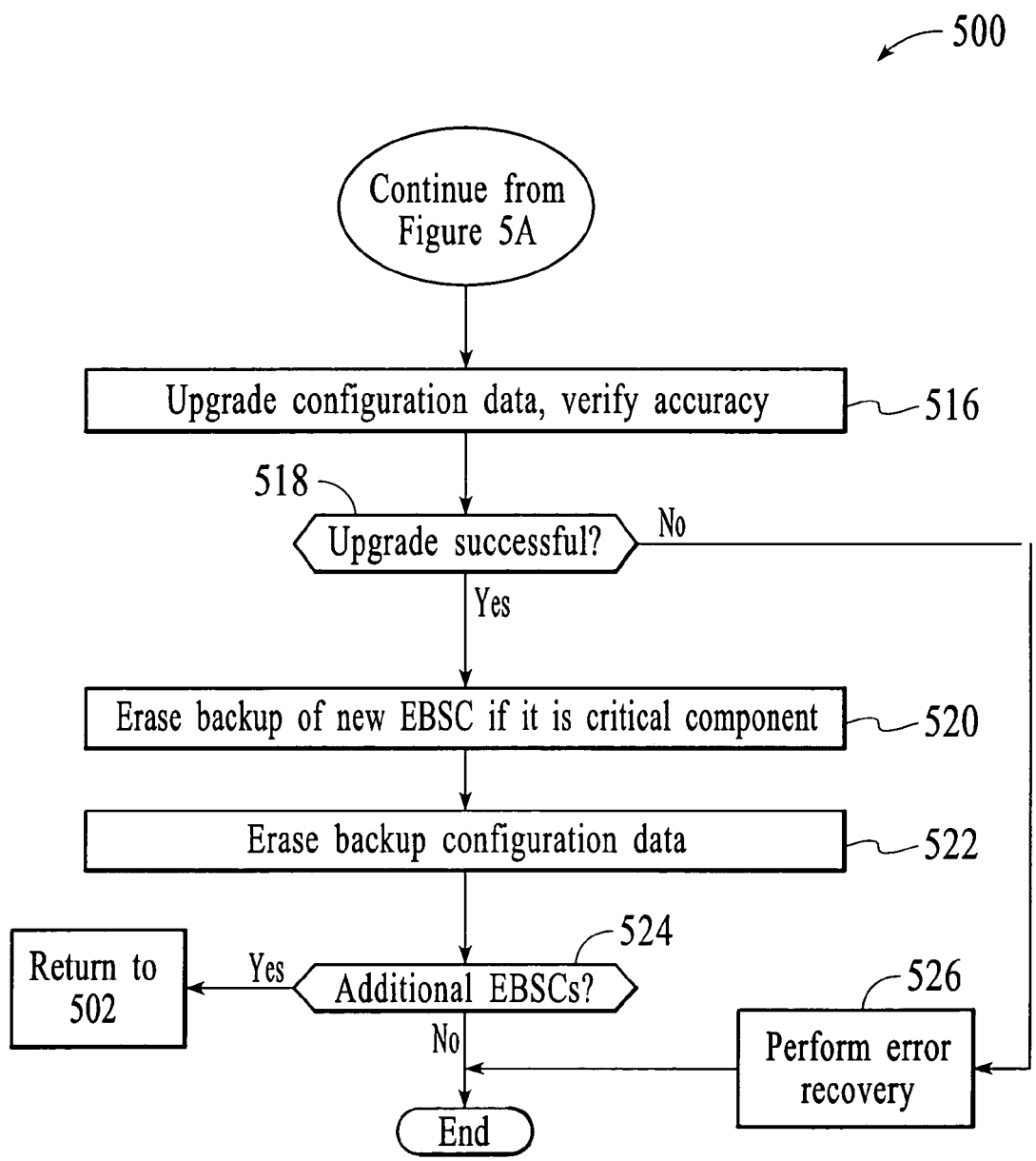

FIGS. 5A and 5B are a flow diagram 500 for upgrading software components including critical components using difference files, under an embodiment. As described above, the upgrade client receives an upgrade file for use in upgrading an original EBSC corresponding to the upgrade file. In this example, the upgrade file includes a difference file, but the embodiment is not so limited. In response to receipt of the upgrade file, the upgrade client verifies the accuracy of the upgrade file contents using a verification algorithm, at block 502. If the verification shows the upgrade file contents to be free of errors, then the upgrade client proceeds with upgrading the original EBSC by copying the original EBSC from client device read-only memory (ROM) to random access memory (RAM), at block 504. Alternatively, the original EBSC can be copied from any area in client device memory to any other area in client device memory, or to different segments of the same memory area. The upgrade client generates the new EBSC using the old EBSC and the upgrade file, and performs verification calculations on the new EBSC, at block 506. A backup version of the new EBSC is generated and verified, at block 508, when the new EBSC is a critical component.

Upon performing an optional reset or reboot of the client device, at block 510, the upgrade client generates a backup configuration file in the client device ROM, at block 512, by copying the configuration file data of the configuration file to a backup configuration file. The accuracy of the backup configuration file can be verified, but the embodiment is not so limited. The upgrade client subsequently deletes the original EBSC from the client device memory, writes the new EBSC into the area of client device memory previously occupied by the original EBSC, and verifies the accuracy of the new EBSC as written to client device memory, at block 514.

In response to generation of the new EBSC, the upgrade client upgrades the original configuration data in accordance with the new EBSC, and verifies the accuracy of the upgraded or new configuration data, at block 516. If the EBSC upgrade is successful and the upgraded configuration data is free of errors, the upgrade client erases the backup copy of the new EBSC, at block 520, and erases the backup configuration file, at block 522. When additional upgrade files are available for use in upgrading additional EBSCs, at block 524, operation returns to block 502 to process the additional upgrades; otherwise the upgrade process is complete.

When the upgraded configuration data contains errors, at block 518, the upgrade client initiates error recovery, at block 526. The error recovery process is described further below.

Figure 6:
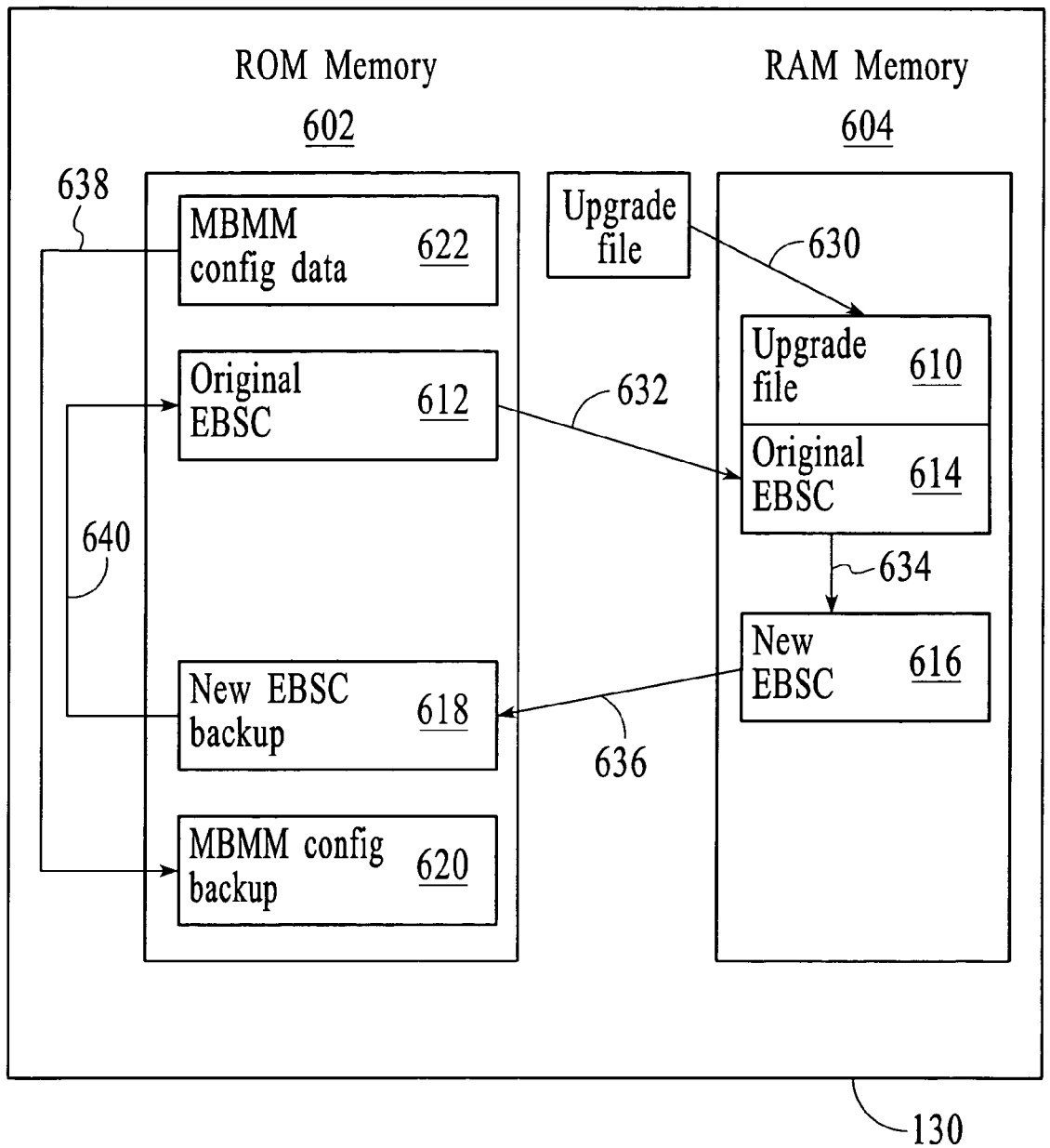
FIG. 6 is a block diagram depiction of critical software component upgrades using difference files, under the embodiment of FIG. 5.

FIG. 6 is a block diagram depiction of critical software component upgrades using difference files, under the embodiment of FIG. 5. The upgrade process of this example uses storage locations in both ROM 602 and RAM 604 memory, but alternative embodiments can use any combination of areas in client device memory 130 or any number of different segments of the same memory area.

The upgrade process beings when the upgrade client receives an upgrade file 610 for use in upgrading an original EBSC corresponding to the upgrade file 610. For purposes of this example, the upgrade file 610 includes a difference file but, alternatively, the upgrade file 610 can include difference files and entire new files or new EBSCs. The upgrade client stores 630 the upgrade file 610 in RAM 604 and verifies the accuracy of the upgrade file contents using a verification algorithm. If the upgrade file 610 is free of errors, then the upgrade client proceeds with upgrading the original EBSC 612 by generating or writing 632 a copy of the original EBSC 614 to RAM 604. The upgrade client generates the new EBSC 616 using the copy of the original EBSC 614 and the upgrade file 610, and writes 634 the new EBSC 616 to RAM 604. The accuracy of the new EBSC 616 is verified, and a backup version of the new EBSC 618 is generated and written 636 to ROM 602 when the new EBSC 616 is a critical component.

In performing upgrades of critical software components, the upgrade client of an embodiment generates backup copies of particular files and stores these backup copies in the client device memory. The client device can use these backup copies along with the upgrade status information of the configuration file to quickly and automatically recover from an error or failure during the upgrade process without having to download additional files or information from the service provider.

For example, upon resetting the client device, the upgrade client writes 638 a backup configuration file 620 to a location in the client device memory, for example the ROM 602. The backup configuration file 620 is generated by copying the configuration data of the original configuration file 622 to the backup configuration file 620 in ROM 602. The upgrade client subsequently deletes the original EBSC 612 from the ROM 602, writes 640 the new EBSC from the backup version of the new EBSC 618 in ROM 602 into the memory area previously occupied by the original EBSC 612, and verifies the accuracy of the new EBSC as written. The upgrade client then upgrades the original configuration data 622 in accordance with the new EBSC. If the EBSC upgrade is successful and the upgraded configuration data is free of errors, the upgrade client deletes the backup version of the new EBSC 618 and the backup configuration file 620 from ROM 602.

Figure 7A:
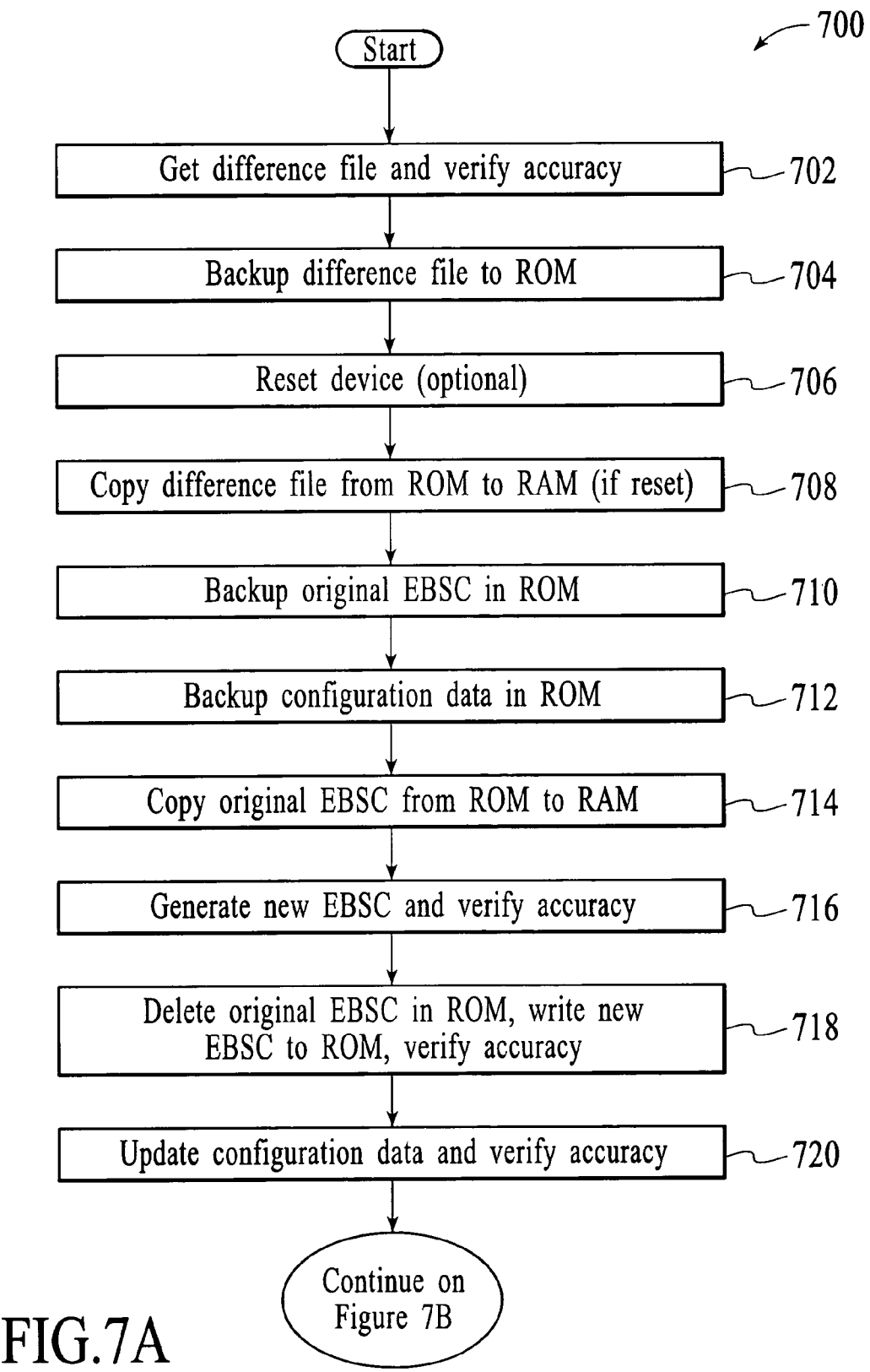
FIGS. 7A and 7B are a flow diagram for upgrading critical software components using difference files, under an alternative embodiment.
Figure 7B:
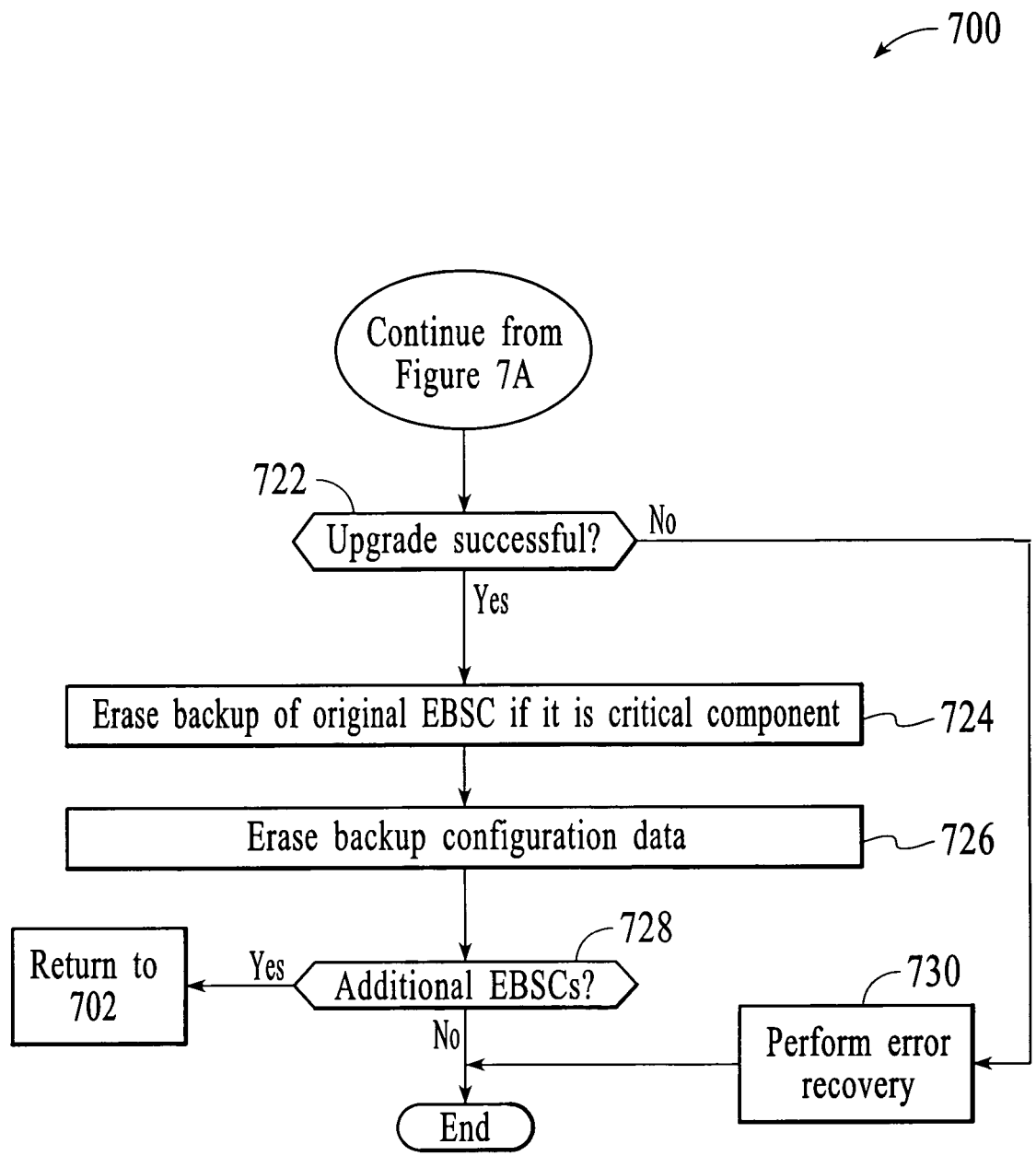

FIGS. 7A and 7B are a flow diagram 700 for upgrading critical software components using difference files, under an alternative embodiment. As described above, the upgrade client receives an upgrade file including a difference file for use in upgrading an original EBSC corresponding to the upgrade file. In response to receipt of the upgrade file, the upgrade client verifies the accuracy of the upgrade file contents using a verification algorithm, at block 702. If the verification shows the upgrade file contents to be free of errors, then the upgrade client proceeds with upgrading the original EBSC by generating a backup version of the upgrade file in client device ROM, at block 704.

Upon performing an optional reset or reboot of the client device, at block 706, the upgrade client copies the backup version of the upgrade file from ROM to RAM, at block 708. The upgrade client generates a backup version of the original EBSC, at block 710, and generates a backup configuration file, at block 512, both of which are written to backup files in client device ROM. The upgrade client also copies the original EBSC from client device ROM to RAM, at block 714.

The upgrade client generates the new EBSC using the original EBSC and the upgrade file stored in client device RAM, at block 716. The upgrade client also performs verification calculations on the new EBSC, but is not so limited. The upgrade client next deletes the original EBSC from the client device ROM, writes the new EBSC from RAM into the area of ROM previously occupied by the original EBSC, and verifies the accuracy of the new EBSC as written to ROM, at block 718.

In response to generation of the new EBSC, the upgrade client upgrades the original configuration data in accordance with the new EBSC, and verifies the accuracy of the upgraded or new configuration data, at block 720. If the EBSC upgrade is successful and the upgraded configuration data is free of errors, the upgrade client erases the backup copy of the original EBSC, at block 724, and erases the backup configuration file, at block 726. When additional upgrade files are available for use in upgrading additional EBSCs, at block 728, operation returns to block 702 to process the additional upgrades; otherwise the upgrade process is complete.

When the upgraded configuration data contains errors, at block 722, the upgrade client initiates error recovery, at block 730. The error recovery process is described further below.

Figure 8:
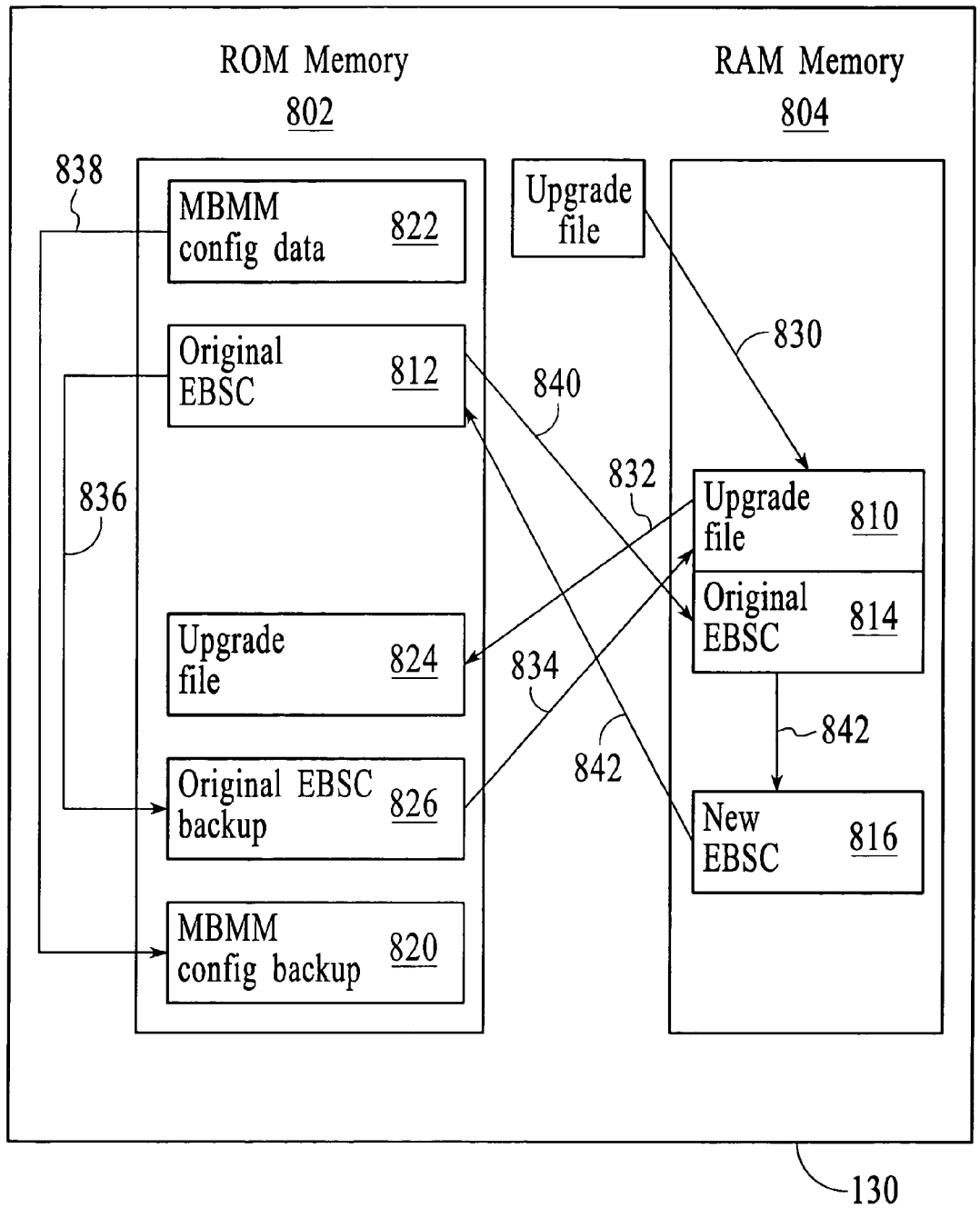
FIG. 8 is a block diagram depiction of critical software component upgrades using difference files, under the embodiment of FIGS. 7A and 7B.

FIG. 8 is a block diagram depiction of critical software component upgrades using difference files, under the embodiment of FIGS. 7A and 7B. The upgrade process of this example uses storage locations in both ROM 802 and RAM 804 areas of the client device memory, but alternative embodiments can use any combination of areas in the client device memory 130 or any number of different segments of the same memory area.

The upgrade process begins when the upgrade client receives an upgrade file 810 for use in upgrading an original EBSC 812 corresponding to the upgrade file 810. For purposes of this example, the upgrade file 810 includes a difference file but, alternatively, the upgrade file 810 can include difference files and entire new files or new EBSCs. The upgrade client stores or writes 830 the upgrade file 810 to RAM 804 and verifies the accuracy of the upgrade file contents using a verification algorithm. If the upgrade file 810 is free of errors, the upgrade client proceeds with upgrading the original EBSC 812 by generating and storing 832 a backup version of the upgrade file 824 to client device ROM 802.

Upon resetting the client device, the upgrade client writes 834 the backup version of the upgrade file 824 from ROM 802 to RAM 804. The upgrade client then writes 836 a backup version of the original EBSC 826 in ROM, and writes 838 a backup configuration file 820 in ROM 802. The upgrade client also writes 840 a copy of the original EBSC 814 to RAM 804 from the original EBSC 812 in ROM 802.

The upgrade client generates 842 the new EBSC 816 using the copy of the original EBSC 814 and the upgrade file 810 stored in RAM 804. The upgrade client also performs verification calculations on the new EBSC 816, but is not so limited. The upgrade client subsequently deletes the original EBSC 812 from ROM 802, writes 842 the new EBSC 816 from RAM 804 into the area of ROM previously occupied by the original EBSC 812, and verifies the accuracy of the new EBSC as written to ROM 802.

In response to generation of the new EBSC 816, the upgrade client also upgrades the original configuration data 822 in accordance with the new EBSC 816, and verifies the accuracy of the upgraded or new configuration data. If the EBSC upgrade is successful and the upgraded configuration data is free of errors, the upgrade client erases the backup copy of the original EBSC 826 and the backup configuration file 820 and terminates the upgrade process.

Figure 9:
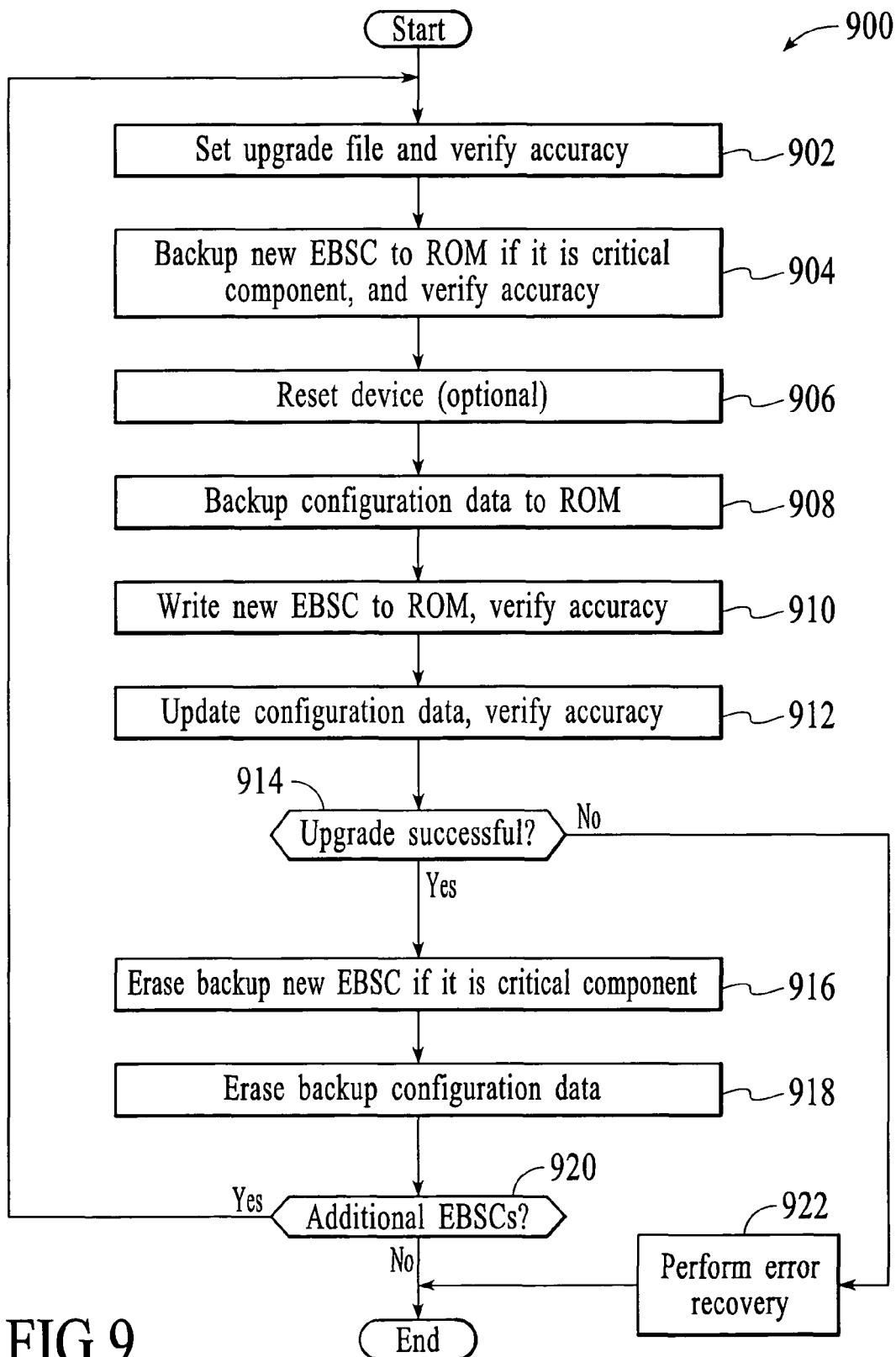
FIG. 9 is a flow diagram for upgrading critical software components using new files, under an embodiment.

FIG. 9 is a flow diagram 900 for upgrading critical software components using new files, under an embodiment. The upgrade client receives an upgrade file for use in upgrading an original file corresponding to the upgrade file, and verifies the accuracy of the upgrade file contents using a verification algorithm, at block 902. In this example, the upgrade file includes a complete new EBSC or file, but the embodiment is not so limited. If the verification shows the new file contents to be free of errors, then the upgrade client proceeds with upgrading the original file by generating a backup version of the new file and verifying the accuracy of the backup version of the new file, at block 904, when the new file is a critical software component.

Upon performing a reset or reboot of the client device, at block 906, the timing of which is optional, the upgrade client generates a backup configuration file in the client device ROM, at block 908, by copying the configuration file data of the configuration file to a backup configuration file. The accuracy of the backup configuration file can be verified, but the embodiment is not so limited. The upgrade client subsequently writes the backup version of the new file into an appropriate area of client device memory for use by the client device, and verifies the accuracy of the new file as written, at block 910.

If the verification shows the new file contents to be free of errors, then the upgrade client proceeds by upgrading the original configuration data in accordance with the new file, and verifies the accuracy of the upgraded or new configuration data, at block 912. If the new file upgrade is successful and the upgraded configuration data is free of errors, the upgrade client erases the backup copy of the new file, at block 916, and erases the backup configuration file, at block 918. When additional upgrade files are available for use in upgrading additional files, at block 920, operation returns to block 902 to process the additional upgrades; otherwise the upgrade process is complete.

When the upgraded configuration data contains errors, at block 914, the upgrade client initiates error recovery, at block 922. The error recovery process is described further below.

Figure 10:
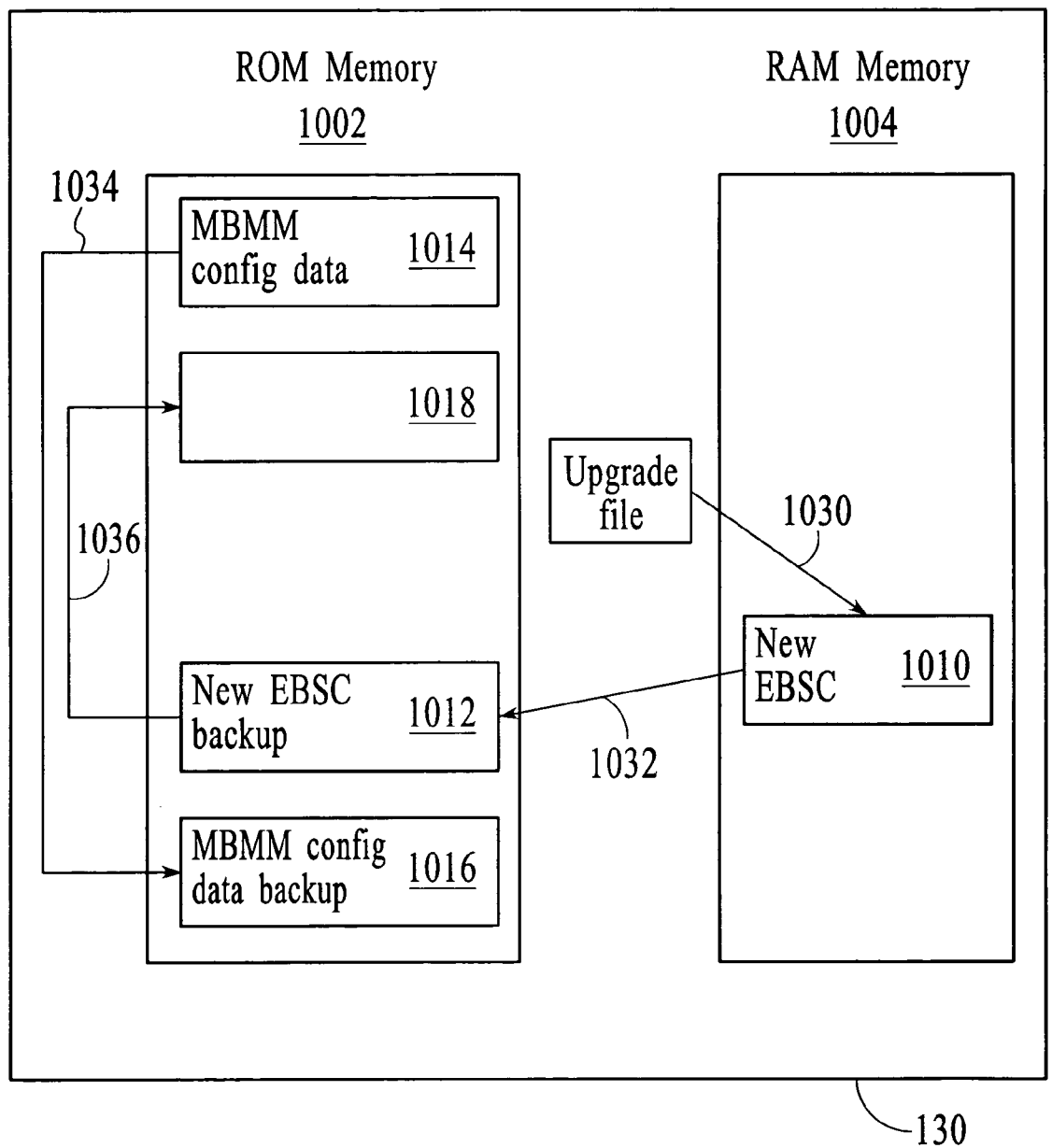
FIG. 10 is a block diagram depiction of critical software component upgrades using new files, under the embodiment of FIG. 9.

FIG. 10 is a block diagram depiction of critical software component upgrades using new files, under the embodiment of FIG. 9. The upgrade process of this example uses storage locations in both ROM 1002 and RAM 1004, but alternative embodiments can use any combination of areas in client device memory 130 or any number of different segments of the same memory area.

The upgrade process beings when the upgrade client receives an upgrade file 1010 for use in upgrading client device software. For purposes of this example, the upgrade file 1010 includes an entire new file, but is not so limited and may include difference files and/or any number of new EBSCs. The upgrade client writes 1030 the new file 1010 to RAM 1004 and verifies the accuracy of the new file contents using a verification algorithm.

If the new file 1010 is free of errors, then the upgrade client proceeds with upgrading the client device software files by generating and writing 1032 a backup version of the new file 1012 to ROM 1002. The accuracy of the backup version of the new file 1012 is verified when the new file is a critical software component.

Upon resetting the client device, the timing of which is optional, the upgrade client generates 1034 a backup configuration file 1016 in ROM 1002. The backup configuration file 1016 is generated by copying the configuration data of the original configuration file 1014 to the backup configuration file 1016. The upgrade client subsequently writes 1036 the backup version of the new file 1012 into an appropriate area 1018 of client device memory for use by the client device, and verifies the accuracy of the new file as written. The upgrade client then upgrades the original configuration data 1014 in accordance with the new file. If the file upgrade is successful and the upgraded configuration data is free of errors, the upgrade client erases the backup version of the new file 1012 and the backup configuration file 1016.

Regardless of the upgrade method used by the upgrade client, the upgrade system provides fail-safe software upgrades in client devices by recovering the client device to a pre-determined state in response to failures during the software upgrades. The upgrade system of an embodiment recovers the client device to a pre-update state and resumes or re-initiates the update that was in progress at the time of the failure. The recovery process includes algorithms for recovering from errors during critical component upgrades using difference files, recovering from errors during non-critical component upgrades using difference files, recovering from errors during critical component upgrades using new files, and recovering from errors during non-critical component upgrades using new files, as described below.

Figure 11:
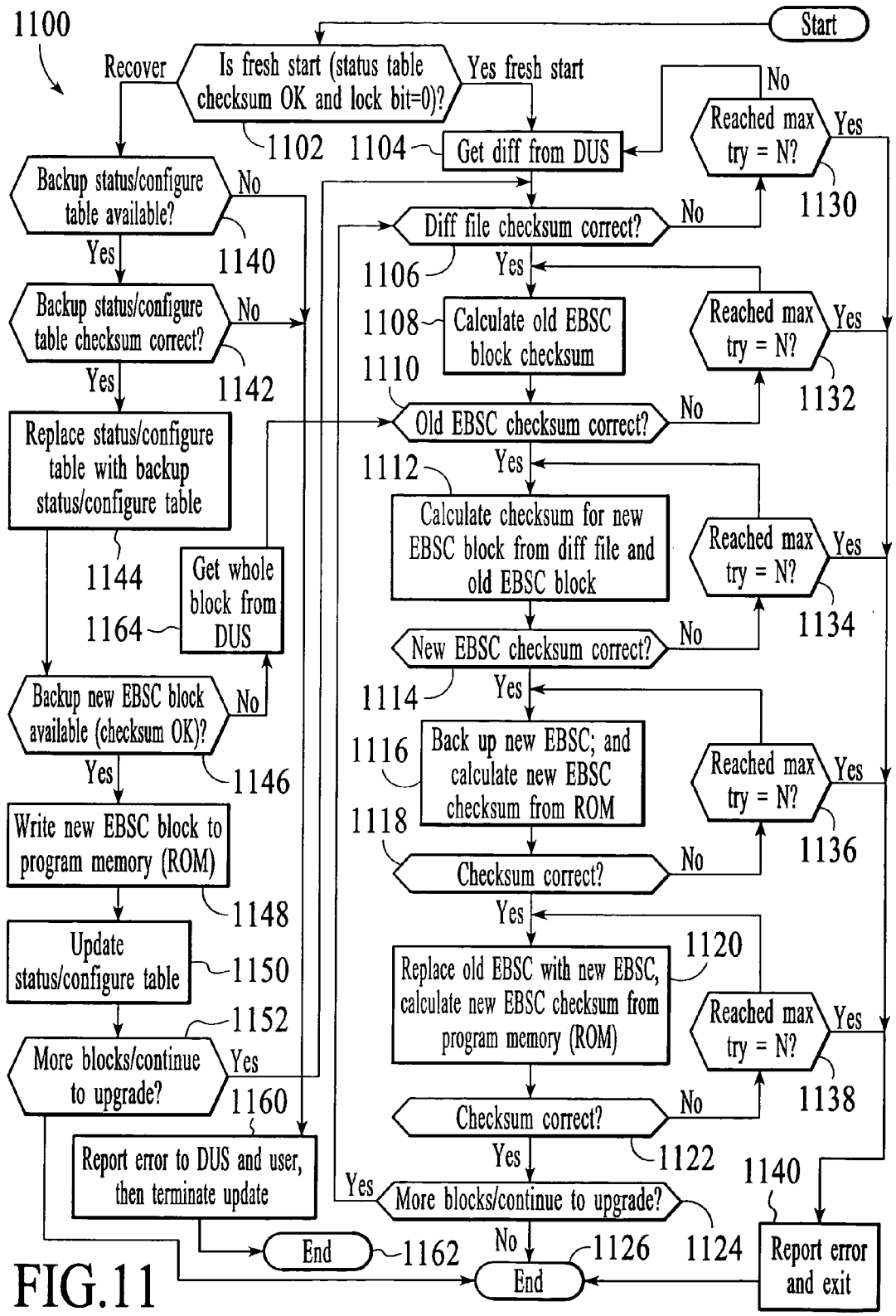
FIG. 11 is a flow diagram for recovering a client device from errors during critical component upgrades using difference files, under an embodiment.

FIG. 11 is a flow diagram 1100 for recovering a client device from errors occurring in the upgrade process during critical component upgrades using difference files, under an embodiment. In performing file upgrades, the upgrade client begins by determining whether the file upgrades are being performed for the first time in response to the availability of new files, or whether the client device is being recovered from errors that occurred during previous upgrade attempts, at block 1102.

When performing file upgrades for the first time, the upgrade client receives an upgrade file in the form of a difference file for use in upgrading an original EBSC corresponding to the upgrade file, at block 1104. In response to receipt of the difference file, the upgrade client uses the checksum value of the difference file to determine whether the difference file contents are free from errors, at block 1106. This process of receiving the difference file and evaluating the accuracy of the file contents is repeated until either an error-free difference file is received, or until the process has been repeated a pre-specified number of times, N. Upon repeating the process the pre-specified number of times N without success, at block 1130, the upgrade client uses resources of the client device to report the error to the client device user and the service provider's upgrade server, at block 1140, and terminates the upgrade process, at block 1126.

In response to the receipt of an accurate difference file, at block 1104, the upgrade client verifies the accuracy of the original EBSC contents, at block 1108. If the checksum value of the original EBSC is determined to be incorrect, at block 1110, the process of calculating the checksum of the original EBSC is repeated until a correct checksum value is calculated, or until the process has been repeated a pre-specified number of times, N. Upon repeating the process the pre-specified number of times N without success, at block 1132, the upgrade client uses resources of the client device to report the error to the client device user and the service provider's upgrade server, at block 1140, and terminates the upgrade process, at block 1126.

When the original EBSC contents are determined to be accurate, at block 1110, the upgrade client generates the new EBSC using the original EBSC and the difference file, at block 1112. The upgrade client also performs verification calculations on the contents of the new EBSC. If the checksum value of the new EBSC is determined to be incorrect, at block 1114, the process of generating the new EBSC and calculating the checksum is repeated until a correct checksum value is calculated, or until the process has been repeated a pre-specified number of times, N. Upon repeating the process the pre-specified number of times N without success, at block 1134, the upgrade client uses resources of the client device to report the error to the client device user and the service provider's upgrade server, at block 1140, and terminates the upgrade process, at block 1126.

When the upgrade client determines that the contents of new EBSC are accurate, at block 1114, a backup version of the new EBSC is generated and written to device memory, at block 1116. The accuracy of the backup version of the new EBSC is also verified using checksum values. If the checksum value of the backup version of the new EBSC block is determined to be incorrect, at block 1118, the process of generating the backup version of the new EBSC and calculating the checksum is repeated until a correct checksum value is calculated, or until the process has been repeated a pre-specified number of times, N. Upon repeating the process the pre-specified number of times N without success, at block 1136, the upgrade client uses resources of the client device to report the error to the client device user and the service provider's upgrade server, at block 1140, and terminates the upgrade process, at block 1126.

Upon verifying the accuracy of the backup version of the new EBSC, at block 1118, the upgrade client replaces the original EBSC in the device ROM with the new EBSC, at block 1120. Checksum calculations are performed on the new EBSC as written to the device ROM to verify the accuracy of the file. If the checksum value of the new EBSC is determined to be incorrect, at block 1122, the process of writing the new EBSC to device ROM and calculating the checksum is repeated until a correct checksum value is calculated, indicating that the new EBSC was properly written to device ROM, or until the process has been repeated a pre-specified number of times, N. Upon repeating the process the pre-specified number of times N without success, at block 1138, the upgrade client uses resources of the client device to report the error to the client device user and the service provider's upgrade server, at block 1140, and terminates the upgrade process, at block 1126.

Upon verifying the accuracy of the new EBSC as written to the device ROM, at block 1122, the upgrade client determines whether additional difference files are available for use in upgrading corresponding original EBSCs, at block 1124. Operation returns to block 1106 to process any additional difference files; otherwise the upgrade process ends, at block 1126.

When the upgrade client determines, at block 1102, that the device is being recovered from errors that occurred during previous upgrade attempts, the upgrade client initiates recovery by determining whether a backup configuration file is available in the client device, at block 1140. As indicated above, the backup configuration file includes backup configuration data. When backup configuration data is available, the upgrade client determines whether the backup configuration data is accurate by evaluating the associated checksum value, at block 1142. If backup configuration data is not available in the client device, at block 1140, or if backup configuration data is available and the checksum value indicates the data is in error, at block 1142, the upgrade client uses resources of the client device to report the error to the client device user and the service provider's upgrade server, at block 1160. The upgrade client then terminates the upgrade process, at block 1162.

When error-free backup configuration data is available in the client device, the upgrade client writes the backup configuration data over the original configuration data in the original configuration file, at block 1144. The upgrade client then determines the availability of a backup version of the new EBSC in the client device, at block 1146.

If a backup version of the new EBSC is available in the client device, the upgrade client upgrades the original EBSC by writing the backup version of the new EBSC over the corresponding original EBSC in device memory, at block 1148; the configuration data is subsequently upgraded in accordance with the new EBSC, at block 1150. The upgrade client then determines whether additional difference files are available for use in upgrading other original EBSCs, at block 1152. Operation returns to block 1106 to process any additional difference files; otherwise the upgrade process ends, at block 1126.

If a backup version of the new EBSC is found not to be available in the client device, at block 1146, then the upgrade client retrieves the corresponding original EBSC from the upgrade server, at block 1164. Upon receiving the original EBSC, the upgrade client proceeds with re-generating a new EBSC, at block 1110, as described above.

Figure 12:
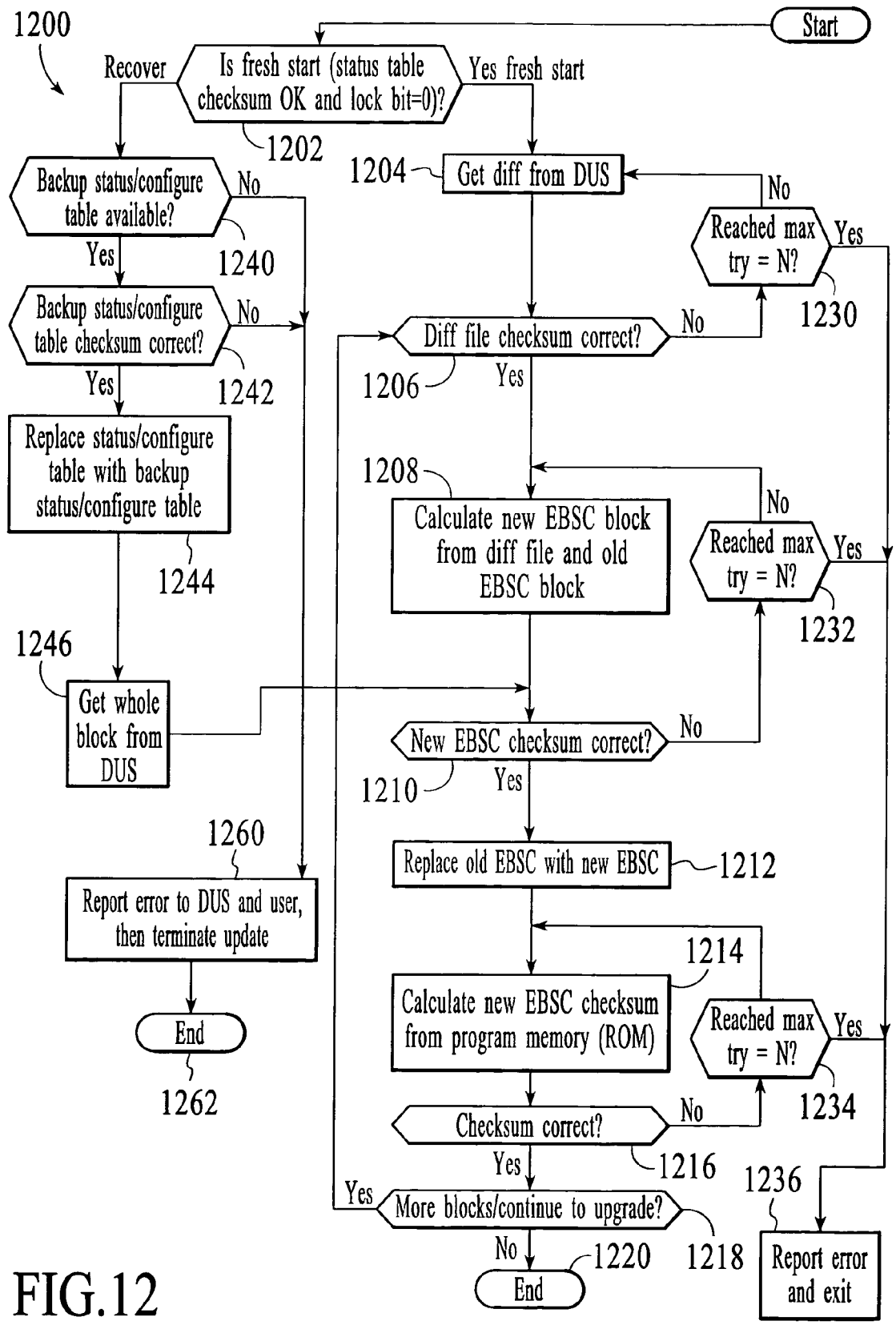
FIG. 12 is a flow diagram for recovering a client device from errors during non-critical component upgrades using difference files, under an embodiment.

FIG. 12 is a flow diagram 1200 for recovering a client device from errors occurring in the upgrade process during non-critical component upgrades using difference files, under an embodiment. In performing file upgrades, the upgrade client begins by determining whether the file upgrades are being performed for the first time in response to the availability of new files, or whether the client device is being recovered from errors that occurred during previous upgrade attempts, at block 1202.

When performing file upgrades for the first time, the upgrade client receives an upgrade file in the form of a difference file for use in upgrading an original EBSC corresponding to the upgrade file, at block 1204. In response to receipt of the difference file, the upgrade client uses the checksum value of the difference file to determine whether the difference file contents are free from errors, at block 1206. This process of receiving the difference file and evaluating the accuracy of the file contents is repeated until either an error-free difference file is received, or until the process has been repeated a pre-specified number of times, N. Upon repeating the process the pre-specified number of times N without success, at block 1230, the upgrade client uses resources of the client device to report the error to the client device user and the service provider's upgrade server, and terminates the upgrade process, at block 1236.

In response to the receipt of an accurate difference file, at block 1204, the upgrade client generates the new EBSC using the original EBSC and the difference file, at block 1208. The upgrade client also performs verification calculations on the contents of the new EBSC. If the checksum value of the new EBSC is determined to be incorrect, at block 1210, the process of generating the new EBSC and calculating the checksum is repeated until a correct checksum value is calculated, or until the process has been repeated a pre-specified number of times, N. Upon repeating the process the pre-specified number of times N without success, at block 1232, the upgrade client uses resources of the client device to report the error to the client device user and the service provider's upgrade server, and terminates the upgrade process, at block 1236.

When the upgrade client determines that the contents of new EBSC are accurate, at block 1210, the upgrade client replaces the original EBSC in the device ROM with the new EBSC, at block 1212. Checksum calculations are performed on the new EBSC as written to the device ROM to verify the accuracy of the file, at block 1214. If the checksum value of the new EBSC is determined to be incorrect, at block 1216, the process of calculating the checksum of the new EBSC as written to the client device ROM is repeated until a correct checksum value is received, indicating that the new EBSC was properly written to device ROM, or until the process has been repeated a pre-specified number of times, N. Upon repeating the process the pre-specified number of times N without success, at block 1234, the upgrade client uses resources of the client device to report the error to the client device user and the service provider's upgrade server, and terminates the upgrade process, at block 1236.

Upon verifying the accuracy of the new EBSC as written to the device ROM, at block 1216, the upgrade client determines whether additional difference files are available for use in upgrading corresponding original EBSCs, at block 1218. Operation returns to block 1206 to process any additional difference files; otherwise the upgrade process ends, at block 1220.

When the upgrade client determines, at block 1202, that the device is being recovered from errors that occurred during previous upgrade attempts, the upgrade client initiates recovery by determining whether a backup configuration file is available in the client device, at block 1240. As indicated above, the backup configuration file includes backup configuration data. When backup configuration data is available, the upgrade client determines whether the backup configuration data is accurate by evaluating the associated checksum value, at block 1242. If backup configuration data is not available in the client device, at block 1240, or if backup configuration data is available and the checksum value indicates the data is in error, at block 1242, the upgrade client uses resources of the client device to report the error to the client device user and the service provider's upgrade server, at block 1260. The upgrade client then terminates the upgrade process, at block 1262.

When error-free backup configuration data is available in the client device, the upgrade client writes the backup configuration data over the original configuration data in the original configuration file, at block 1244. The upgrade client then retrieves the corresponding original EBSC from the upgrade server, at block 1246. Upon receiving the original EBSC, the upgrade client proceeds with re-generating the new EBSC, at block 1210, as described above.

Figure 13:
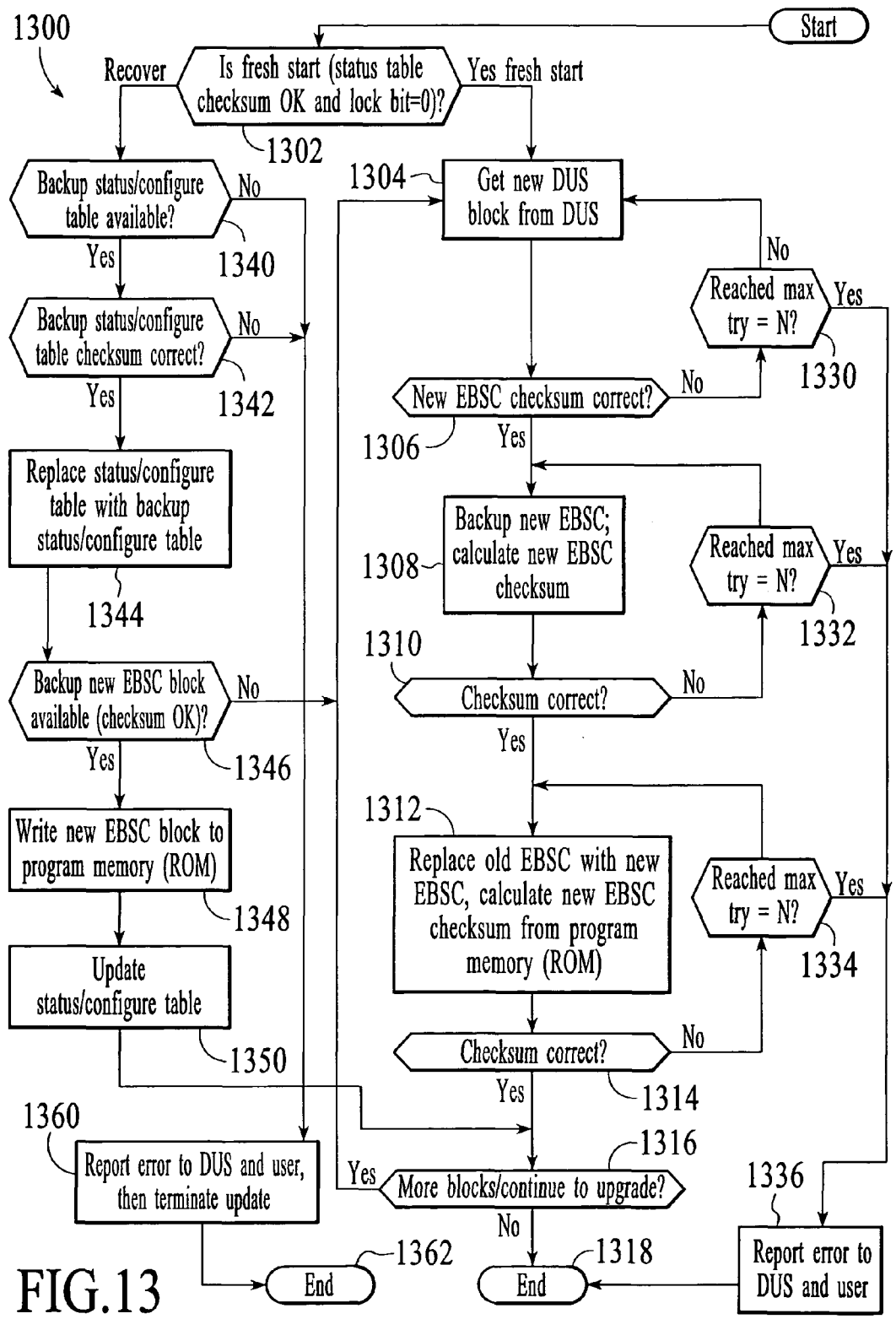
FIG. 13 is a flow diagram for recovering a client device from errors during critical component upgrades using new files, under an embodiment.

FIG. 13 is a flow diagram 1300 for recovering a client device from errors occurring in the upgrade process during critical component upgrades using new files or EBSCs, under an embodiment. In performing file upgrades, the upgrade client begins by determining whether the file upgrades are being performed for the first time in response to the availability of new EBSCs, or whether the client device is being recovered from errors that occurred during previous upgrade attempts, at block 1302.

When performing file upgrades for the first time, the upgrade client receives an upgrade file in the form of a new EBSC for use in upgrading an original EBSC corresponding to the upgrade file, at block 1304. In response to receipt of the new EBSC, the upgrade client uses the checksum value of the new EBSC to determine whether the contents of the new EBSC are free from errors, at block 1206. This process of receiving the new EBSC and evaluating the accuracy of the file contents is repeated until either an error-free new file is received, or until the process has been repeated a pre-specified number of times, N. Upon repeating the process the pre-specified number of times N without success, at block 1330, the upgrade client uses resources of the client device to report the error to the client device user and the service provider's upgrade server, at block 1336, and terminates the upgrade process, at block 1318.

In response to the receipt of an accurate new EBSC, at block 1304, the upgrade client generates a backup version of the new EBSC and calculates a checksum value corresponding to the backup version, at block 1308. If the checksum value of the backup version of the new EBSC is determined to be incorrect, at block 1310, the process of generating a backup version of the new EBSC and calculating the corresponding checksum is repeated until a correct checksum value is calculated, or until the process has been repeated a pre-specified number of times, N. Upon repeating the process the pre-specified number of times N without success, at block 1332, the upgrade client uses resources of the client device to report the error to the client device user and the service provider's upgrade server, at block 1336, and terminates the upgrade process, at block 1318.

When the new EBSC contents are determined to be correct, at block 1310, the upgrade client replaces the original EBSC in the device ROM with the new EBSC, at block 1312. Checksum calculations are performed on the new EBSC as written to the device ROM to verify the accuracy of the file. If the checksum value of the new EBSC is determined to be incorrect, at block 1314, the process of writing the new EBSC to device ROM and calculating the checksum is repeated until a correct checksum value is calculated, indicating that the new EBSC was properly written to device ROM, or until the process has been repeated a pre-specified number of times, N. Upon repeating the process the pre-specified number of times N without success, at block 1334, the upgrade client uses resources of the client device to report the error to the client device user and the service provider's upgrade server, at block 1336, and terminates the upgrade process, at block 1318.

Upon verifying the accuracy of the new EBSC as written to the device ROM, at block 1314, the upgrade client determines whether additional new EBSCs are available for use in upgrading corresponding original EBSCs, at block 1316. Operation returns to block 1304 to process any additional new EBSCs; otherwise the upgrade process ends, at block 1318.

When the upgrade client determines, at block 1302, that the device is being recovered from errors that occurred during previous upgrade attempts, the upgrade client initiates recovery by determining whether a backup configuration file is available in the client device, at block 1340. When backup configuration data is available in a backup configuration file, the upgrade client determines whether the backup configuration data is accurate by evaluating the associated checksum value, at block 1342. If backup configuration data is not available in the client device, at block 1340, or if backup configuration data is available and the checksum value indicates the data is in error, at block 1342, the upgrade client uses resources of the client device to report the error to the client device user and the service provider's upgrade server, at block 1360. The upgrade client then terminates the upgrade process, at block 1362.

When error-free backup configuration data is available in the client device, the upgrade client writes the backup configuration data over the original configuration data in the original configuration file, at block 1344. The upgrade client then determines the availability of a backup version of the new EBSC in the client device, at block 1346.

If a backup version of the new EBSC is available in the client device, the upgrade client upgrades the original EBSC by writing the backup version of the new EBSC over the corresponding original EBSC in device memory, at block 1348; the configuration data is subsequently upgraded in accordance with the new EBSC, at block 1350. The upgrade client then determines whether additional new EBSCs are available for use in upgrading other original EBSCs, at block 1316.

If a backup version of the new EBSC is found not to be available in the client device, at block 1346, then the upgrade client retrieves the new EBSC from the upgrade server, at block 1304. Upon receiving the new EBSC, the upgrade client proceeds with the upgrade as described above.

Figure 14:
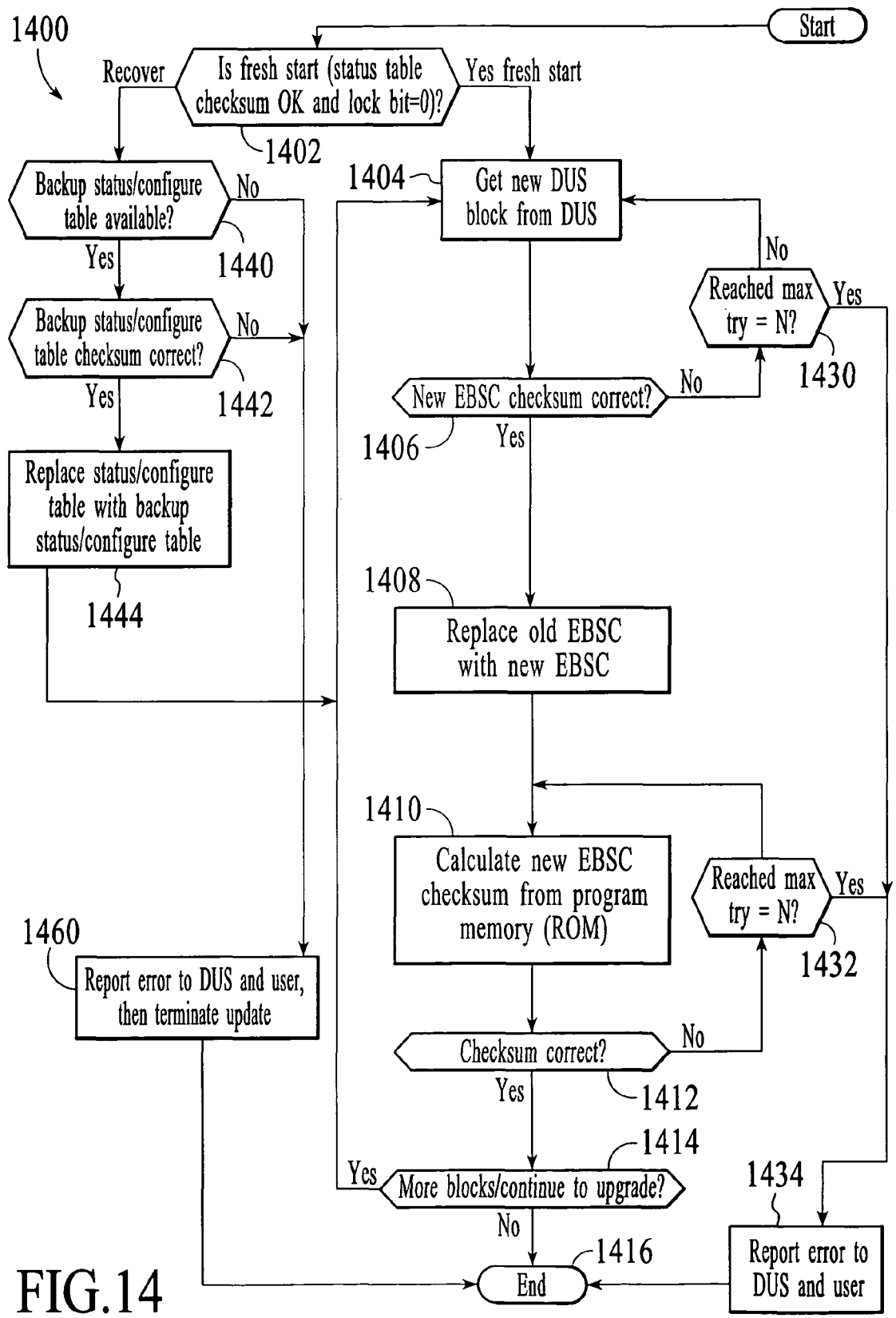
FIG. 14 is a flow diagram for recovering a client device from errors during non-critical component upgrades using new files, under an embodiment.

FIG. 14 is a flow diagram 1400 for recovering a client device from errors occurring in the upgrade process during non-critical component upgrades using new files, under an embodiment. In performing file upgrades, the upgrade client begins by determining whether the file upgrades are being performed for the first time in response to the availability of new files, or whether the client device is being recovered from errors that occurred during previous upgrade attempts, at block 1402.

When performing file upgrades for the first time, the upgrade client receives an upgrade file in the form of a new EBSC for use in upgrading an original EBSC corresponding to the upgrade file, at block 1404. In response to receipt of the new EBSC, the upgrade client uses the checksum value of the new EBSC to determine whether the contents of the new EBSC are error-free, at block 1406. This process of receiving the new EBSC and evaluating the accuracy of the file contents is repeated until either an error-free difference file is received, or until the process has been repeated a pre-specified number of times, N. Upon repeating the process the pre-specified number of times N without success, at block 1430, the upgrade client uses resources of the client device to report the error to the client device user and the service provider's upgrade server, at block 1434. The upgrade client subsequently terminates the upgrade process, at block 1416.

When the upgrade client determines that the contents of the new EBSC are accurate, at block 1406, the upgrade client replaces the original EBSC in the device ROM with the new EBSC, at block 1408. Checksum calculations are performed on the new EBSC as written to the device ROM to verify the accuracy of the file, at block 1410. If the checksum value of the new EBSC is determined to be incorrect, at block 1412, the process of calculating the checksum of the new EBSC as written to the client device ROM is repeated until a correct checksum value is received, indicating that the new EBSC was properly written to device ROM, or until the process has been repeated a pre-specified number of times, N. Upon repeating the process the pre-specified number of times N without success, at block 1432, the upgrade client uses resources of the client device to report the error to the client device user and the service provider's upgrade server, at block 1434, and terminates the upgrade process, at block 1416.

Upon verifying the accuracy of the new EBSC as written to the device ROM, at block 1412, the upgrade client determines whether additional difference files are available for use in upgrading corresponding original EBSCs, at block 1414. Operation returns to block 1404 to process any additional new EBSCs; otherwise the upgrade process ends, at block 1416.

When the upgrade client determines, at block 1402, that the device is being recovered from errors that occurred during previous upgrade attempts, the upgrade client initiates recovery by determining whether a backup configuration file is available in the client device, at block 1440. When backup configuration data is available in a backup configuration file, the upgrade client determines whether the backup configuration data is accurate by evaluating the associated checksum value, at block 1442. If backup configuration data is not available in the client device, at block 1440, or if backup configuration data is available and the checksum value indicates the data is in error, at block 1442, the upgrade client uses resources of the client device to report the error to the client device user and the service provider's upgrade server, at block 1460. The upgrade client then terminates the upgrade process, at block 1416.

When error-free backup configuration data is available in the client device, the upgrade client writes the backup configuration data over the original configuration data in the original configuration file, at block 1444. The upgrade client then proceeds with receiving the new EBSC, at block 1404, and upgrading the corresponding original EBSC as described above.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and communication systems, not only for the file updating described above.

The elements and acts of the various embodiments described above can be combined to provide further embodiments. These and other changes can be made to the invention in light of the above detailed description.

All of the above references and United States patents and patent applications are incorporated herein by reference. Aspects of the invention can be modified, if necessary, to employ the systems, functions and concepts of the various patents and applications described above to provide yet further embodiments of the invention.

In general, in the following claims, the terms used should not be construed to limit the invention to the specific embodiments disclosed in the specification and the claims, but should be construed to include all processing systems that operate under the claims to provide a method for file differencing and updating. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A portable communication device comprising an embedded system:
   the portable communication device comprising at least one storage medium and including one or more applications running on at least one hardware processor and configured to,
   automatically detect a remote change of one or more software components of the embedded system;
   receive upgrade files via a wireless link and automatically initiate an upgrade of the one or more software components of the embedded system in a memory of the device using contents of the upgrade files, wherein the at least one storage medium includes the memory;
   create a backup version of a new embedded software component associated with at least one of the upgrade files and store the backup version in the memory, wherein the new embedded software component is generated during the upgrading of the one or more software components, wherein the generating the new embedded software component comprises applying the contents of the at least one of the upgrade files to a copy of an original embedded software component associated with the at least one of the upgrade files to generate the new embedded software component, wherein the contents of the at least one of the upgrade files include difference files;
   install the new embedded software component using the backup version of the new embedded software component by writing the backup version into a memory area previously occupied by another embedded software component, wherein the at least one storage medium includes the memory area;
   determine a failure of the upgrade to complete, wherein the failure is associated with an incomplete upgrade of the one or more software components;
   select a recovery process from a plurality of recovery processes, the selecting using a plurality of recovery factors, wherein the plurality of recovery factors include a component type of the software component being upgraded and a file type of the upgrade file being used for the upgrade; and
   independently and automatically recover device operation to a pre-upgrade state using the selected recovery process in response to the failure, and automatically continue the upgrade.

2. The device of claim 1, wherein the upgrade includes repairing errors in the one or more software components.

3. The device of claim 1, wherein the upgrade includes upgrading the one or more software components to a relatively newer version.

4. The device of claim 1, wherein the upgrade includes adding a new software component to the one or more software components.

5. The device of claim 1, wherein the contents of the upgrade files include embedded software components.

6. The device of claim 1, wherein the contents of the upgrade files include data to repair errors in the one or more software components.

7. The device of claim 1, wherein the contents of the upgrade files include a new version of a software component to replace an existing one of the software components.

8. The device of claim 1, wherein the contents of the upgrade files include a new software component to add to the one or more software components.

9. The device of claim 1, wherein the embedded system is configured to apply at least one error checking and correction process to at least one of the contents of the upgrade file, software components to be upgraded, contents of an upgraded software component, and configuration data of the embedded system.

10. The device of claim 1, wherein configured to automatically recover device operation to a pre-upgrade state includes configured to retrieve the backup configuration data from a module-based memory management embedded software component that includes backup configuration data in the memory, and replace configuration data of the embedded system with the backup configuration data.

11. The device of claim 10, wherein the backup configuration data includes a pre-upgrade version of the configuration data.

12. The device of claim 10, wherein configured to automatically initiate an upgrade includes configured to automatically upgrade at least one critical software component by generating an upgraded software component corresponding to an original version of the critical software component and writing the upgraded software component to at least one memory area of the at least one storage medium.

13. The device of claim 12, wherein configured to automatically recover device operation includes configured to retrieve a backup upgraded software component and write the backup upgraded software component to the at least one memory area.

14. The device of claim 13, wherein the backup upgraded software component includes a pre-upgrade version of the upgraded software component.

15. The device of claim 10, wherein configured to automatically initiate an upgrade includes configured to automatically upgrade at least one critical software component by writing an upgraded software component corresponding to an original version of the critical software component to at least one memory area of the at least one storage medium.

16. The device of claim 15, wherein configured to automatically recover device operation includes configured to retrieve a backup upgraded software component in the portable communication device and write the backup upgraded software component to the at least one memory area.

17. The device of claim 16, wherein the backup upgraded software component includes a pre-upgrade version of the upgraded software component.

18. The device of claim 10, wherein configured to automatically initiate an upgrade includes configured to automatically upgrade at least one non-critical software component by generating an upgraded software component corresponding to an original version of the non-critical software component and writing the upgraded software component to at least one memory area of the at least one storage medium.

19. The device of claim 18, wherein configured to automatically recover device operation includes configured to receive the upgraded software component via the wireless link and write the upgraded software component to the at least one memory area.

20. The device of claim 1, wherein the embedded system includes a microprocessor coupled to an electronic file comprising the one or more software components, wherein the one or more software components are linked.

21. The device of claim 1, wherein the embedded system includes software files including dynamic link library files, shared object files, embedded software components (EBSCs), firmware files, executable files, data files including hex data files, system configuration files, and files including personal use data.

22. The device of claim 1, wherein the pre-update state includes a cellular telephony state.

23. The device of claim 1, wherein the portable communication device is at least one of a cellular telephone, a portable computing device, and a personal digital assistant.

24. A portable communication device comprising:
at least one storage medium and one or more applications running on at least one hardware processor, the portable communication device configured to,
automatically detect a remote change of one or more software components of an embedded system of the portable communication device;
receive an upgrade file via a wireless link as part of an upgrade process and automatically initiate an upgrade of a software component in a memory of the device using information associated with the upgrade file, wherein the at least one storage medium includes the memory;
independently store backup configuration data;
create a backup version of a new embedded software component associated with at least one upgrade file and store the backup version in the memory, wherein the new embedded software component is generated during the upgrading of the one or more software components, wherein the generating the new embedded software component comprises applying the contents of the at least one upgrade file to a copy of an original embedded software component associated with the at least one upgrade file to generate the new embedded software component, wherein the contents of the at least one upgrade file include difference files;
install the new embedded software component using the backup version of the new embedded software component;
determine an incomplete upgrade of the software component associated with the upgrade process;
select a recovery process from a plurality of recovery processes, the selecting using a plurality of recovery factors, wherein the plurality of recovery factors include a component type of the software component being upgraded and a file type of the upgrade file being used for the upgrade; and,
independently recover device operation to a prior state using the selected recovery process and the backup configuration data in response to the incomplete upgrade, and automatically continue the upgrade process.

25. A portable communication device comprising:
at least one storage medium and one or more applications running on at least one hardware processor, the portable communication device configured to perform an upgrade process by,
automatically detecting a remote change of one or more software components of an embedded system of the portable communication device;
receiving an upgrade file via a wireless link and automatically initiate an upgrade of a software component in a memory of the device using information associated with the upgrade file, the at least one storage medium including the memory;
independently storing a backup upgraded software component associated with the upgrade file in the memory of the device;
creating a backup version of a new embedded software component associated with at least one upgrade file and storing the backup version in the memory, wherein the new embedded software component is generated during the upgrading of the one or more software components, wherein the generating the new embedded software component comprises applying the contents of the at least one upgrade file to a copy of an original embedded software component associated with the at least one upgrade file to generate the new embedded software component, wherein the contents of the at least one upgrade file include difference files;
installing the new embedded software component using the backup version of the new embedded software component by writing the backup version into a memory area previously occupied by another embedded software component, wherein the at least one storage medium includes the memory area;
maintaining configuration data in the memory through file upgrades including using information of corresponding upgrade files to upgrade the configuration data in accordance with generation of new embedded software components;
determining if an incomplete upgrade of the software component occurs during the upgrade process;
select a recovery process from a plurality of recovery processes, the selecting using a plurality of recovery factors, wherein the plurality of recovery factors include a component type of the software component being upgraded and a file type of the upgrade file being used for the upgrade; and,
independently recovering device operation to a prior device state using the selected recovery process and the configuration data.

* * * * *